(12) United States Patent
Chilvers et al.

(10) Patent No.: US 8,327,403 B1
(45) Date of Patent: Dec. 4, 2012

(54) SYSTEMS AND METHODS FOR PROVIDING REMOTE PROGRAM ORDERING ON A USER DEVICE VIA A WEB SERVER

(75) Inventors: Henry C. Chilvers, Valencia, CA (US); Craig Alan Olague, Moorpark, CA (US); Kuan Hidalgo Archer, Los Angeles, CA (US)

(73) Assignee: United Video Properties, Inc., Los Angles, CA (US)

( * ) Notice: Subject to any disclaimer, the term of this patent is extended or adjusted under 35 U.S.C. 154(b) by 519 days.

(21) Appl. No.: 11/851,573

(22) Filed: Sep. 7, 2007

(51) Int. Cl.
*G06F 3/00* (2006.01)
*G06F 13/00* (2006.01)
*H04N 5/445* (2006.01)
*H04N 7/173* (2006.01)

(52) U.S. Cl. ............... 725/58; 725/31; 725/39; 725/42; 725/43; 725/61; 725/86; 725/104; 725/109; 725/133

(58) Field of Classification Search ............ 725/31, 725/32, 39, 42, 43, 51, 58, 61, 86, 104, 109, 725/110, 131, 133, 153; 348/552; 386/299
See application file for complete search history.

(56) References Cited

U.S. PATENT DOCUMENTS

| 4,429,385 | A | 1/1984 | Cichelli et al. |
| 4,625,080 | A | 11/1986 | Scott |
| 4,706,121 | A | 11/1987 | Young |
| 4,751,578 | A | 6/1988 | Reiter |
| 4,761,684 | A | 8/1988 | Clark et al. |
| 4,787,063 | A | 11/1988 | Muguet |
| 4,908,707 | A | 3/1990 | Kinghorn |
| 5,016,273 | A | 5/1991 | Hoff |
| 5,036,314 | A | 7/1991 | Barillari et al. |
| 5,089,885 | A | 2/1992 | Clark |
| 5,113,259 | A | 5/1992 | Romesburg et al. |
| 5,132,992 | A | 7/1992 | Yurt et al. |
| 5,155,591 | A | 10/1992 | Wachob |
| 5,168,353 | A | 12/1992 | Walker et al. |
| 5,202,915 | A | 4/1993 | Nishii |
| 5,223,924 | A | 6/1993 | Strubbe et al. |
| 5,233,423 | A | 8/1993 | Jernigan et al. |
| 5,253,066 | A | 10/1993 | Vogel |

(Continued)

FOREIGN PATENT DOCUMENTS

DE 3151492 7/1983

(Continued)

OTHER PUBLICATIONS

U.S. Appl. No. 09/332,244, filed Jun. 11, 1999, Ellis, et al.

(Continued)

*Primary Examiner* — Pinkal R Chokshi
(74) *Attorney, Agent, or Firm* — Ropes & Gray LLP

(57) ABSTRACT

Methods and systems for remotely scheduling for recording or ordering a program advertised on a web page of a website. A program advertisement is displayed on a user device. In response to a user's selection of the advertisement, information is transmitted from the user device to a web server of the web page without navigating the user away from the website. The information includes information that identifies a user's equipment to a remote access server. A record request or an order request is transmitted by the web server to the remote access server. The remote access server cross-references the record or order request with an action request. The action request is transmitted to the user's television equipment to record or access the advertised program.

25 Claims, 23 Drawing Sheets

U.S. PATENT DOCUMENTS

| | | | |
|---|---|---|---|
| 5,335,277 A | 8/1994 | Harvey et al. | |
| 5,353,121 A | 10/1994 | Young et al. | |
| 5,359,367 A | 10/1994 | Stockill | |
| 5,382,983 A | 1/1995 | Kwoh et al. | |
| 5,410,326 A | 4/1995 | Goldstein | |
| 5,414,756 A | 5/1995 | Levine | |
| 5,455,570 A | 10/1995 | Cook et al. | |
| 5,465,113 A | 11/1995 | Gilboy | |
| 5,469,206 A | 11/1995 | Strubbe et al. | |
| 5,479,266 A | 12/1995 | Young et al. | |
| 5,479,268 A | 12/1995 | Young et al. | |
| 5,481,296 A | 1/1996 | Cragun et al. | |
| 5,483,278 A | 1/1996 | Strubbe et al. | |
| 5,502,504 A | 3/1996 | Marshall et al. | |
| 5,509,908 A | 4/1996 | Hillstead et al. | |
| 5,523,796 A | 6/1996 | Marshall et al. | |
| 5,524,195 A | 6/1996 | Clanton, III et al. | |
| 5,526,034 A | 6/1996 | Hoarty et al. | |
| 5,528,304 A | 6/1996 | Cherrick et al. | |
| 5,534,911 A | 7/1996 | Levitan | |
| 5,550,576 A | 8/1996 | Klosterman | |
| 5,550,863 A | 8/1996 | Yurt et al. | |
| 5,559,548 A | 9/1996 | Davis et al. | |
| 5,559,549 A | 9/1996 | Hendricks et al. | |
| 5,559,550 A | 9/1996 | Mankovitz | |
| 5,570,295 A | 10/1996 | Isenberg et al. | |
| 5,572,442 A | 11/1996 | Schulhof et al. | |
| 5,579,239 A | 11/1996 | Freeman et al. | |
| 5,583,560 A | 12/1996 | Florin et al. | |
| 5,585,838 A | 12/1996 | Lawler et al. | |
| 5,585,865 A | 12/1996 | Amano et al. | |
| 5,585,866 A | 12/1996 | Miller et al. | |
| 5,589,892 A | 12/1996 | Knee et al. | |
| 5,592,482 A | 1/1997 | Abraham | |
| 5,592,551 A | 1/1997 | Lett et al. | |
| 5,594,509 A | 1/1997 | Florin et al. | |
| 5,596,373 A | 1/1997 | White et al. | |
| 5,600,364 A | 2/1997 | Hendricks et al. | |
| 5,606,374 A | 2/1997 | Bertram | |
| 5,617,526 A | 4/1997 | Oran et al. | |
| 5,619,249 A | 4/1997 | Billock et al. | |
| 5,621,456 A | 4/1997 | Florin et al. | |
| 5,623,613 A | 4/1997 | Rowe et al. | |
| 5,629,733 A | 5/1997 | Youman et al. | |
| 5,630,119 A | 5/1997 | Aristides et al. | |
| 5,631,995 A | 5/1997 | Weissensteiner et al. | |
| 5,635,978 A | 6/1997 | Alten et al. | |
| 5,635,979 A | 6/1997 | Kostreski et al. | |
| 5,640,484 A | 6/1997 | Mankovitz | |
| 5,654,748 A | 8/1997 | Matthews, III | |
| 5,655,214 A | 8/1997 | Mullett et al. | |
| 5,657,072 A | 8/1997 | Aristides et al. | |
| 5,657,414 A | 8/1997 | Lett et al. | |
| 5,666,293 A | 9/1997 | Metz et al. | |
| 5,675,390 A | 10/1997 | Schindler et al. | |
| 5,682,206 A | 10/1997 | Wehmeyer et al. | |
| 5,692,214 A | 11/1997 | Levine | |
| 5,694,163 A | 12/1997 | Harrison | |
| 5,699,107 A | 12/1997 | Lawler et al. | |
| 5,710,601 A | 1/1998 | Marshall et al. | |
| 5,710,605 A | 1/1998 | Nelson | |
| 5,710,884 A | 1/1998 | Dedrick | |
| 5,715,020 A | 2/1998 | Kuroiwa et al. | |
| 5,734,720 A | 3/1998 | Salganicoff | |
| 5,734,853 A | 3/1998 | Hendricks et al. | |
| 5,734,893 A | 3/1998 | Li et al. | |
| 5,742,905 A | 4/1998 | Pepe et al. | |
| 5,748,191 A | 5/1998 | Rozak et al. | |
| 5,748,716 A | 5/1998 | Levine | |
| 5,758,257 A | 5/1998 | Herz et al. | |
| 5,758,259 A | 5/1998 | Lawler | |
| 5,774,664 A | 6/1998 | Hidary et al. | |
| 5,774,666 A | 6/1998 | Portuesi | |
| 5,781,246 A | 7/1998 | Alten et al. | |
| 5,787,259 A | 7/1998 | Haroun et al. | |
| 5,788,507 A | 8/1998 | Redford et al. | |
| 5,790,202 A | 8/1998 | Kummer et al. | |
| 5,793,964 A | 8/1998 | Rogers et al. | |
| 5,798,785 A | 8/1998 | Hendricks et al. | |
| 5,812,930 A | 9/1998 | Zavrel | |
| 5,812,931 A | 9/1998 | Yuen | |
| 5,818,441 A | 10/1998 | Throckmorton et al. | |
| 5,828,420 A | 10/1998 | Marshall et al. | |
| 5,844,620 A | 12/1998 | Coleman et al. | |
| 5,850,218 A | 12/1998 | LaJoie et al. | |
| 5,852,437 A | 12/1998 | Wugofski et al. | |
| 5,859,847 A | 1/1999 | Dew et al. | |
| 5,867,233 A | 2/1999 | Tanaka | |
| 5,867,799 A | 2/1999 | Lang et al. | |
| 5,878,222 A | 3/1999 | Harrison | |
| 5,880,768 A | 3/1999 | Lemmons et al. | |
| 5,884,298 A | 3/1999 | Smith, II et al. | |
| 5,886,732 A | 3/1999 | Humpleman | |
| 5,907,323 A | 5/1999 | Lawler et al. | |
| 5,914,746 A | 6/1999 | Matthews, III et al. | |
| 5,917,405 A | 6/1999 | Joao | |
| 5,926,624 A | 7/1999 | Katz et al. | |
| 5,929,849 A | 7/1999 | Kikinis | |
| 5,961,603 A * | 10/1999 | Kunkel et al. | 709/229 |
| 5,977,964 A | 11/1999 | Williams et al. | |
| 5,987,509 A | 11/1999 | Portuesi | |
| 5,988,078 A | 11/1999 | Levine | |
| 6,002,394 A | 12/1999 | Schein et al. | |
| 6,005,565 A | 12/1999 | Legall et al. | |
| 6,006,257 A | 12/1999 | Slezak | |
| 6,009,153 A | 12/1999 | Houghton et al. | |
| 6,012,086 A | 1/2000 | Lowell | |
| 6,014,184 A | 1/2000 | Knee et al. | |
| 6,025,837 A | 2/2000 | Matthews, III et al. | |
| 6,058,238 A | 5/2000 | Ng et al. | |
| 6,064,980 A | 5/2000 | Jacobi et al. | |
| 6,075,568 A | 6/2000 | Matsuura | |
| 6,097,441 A | 8/2000 | Allport | |
| 6,104,334 A | 8/2000 | Allport | |
| 6,130,726 A | 10/2000 | Darbee et al. | |
| 6,144,702 A | 11/2000 | Yurt et al. | |
| 6,160,988 A | 12/2000 | Shroyer | |
| 6,169,543 B1 | 1/2001 | Wehmeyer | |
| 6,177,931 B1 | 1/2001 | Alexander | |
| 6,192,340 B1 | 2/2001 | Abecassis | |
| 6,208,384 B1 | 3/2001 | Schultheiss | |
| 6,233,734 B1 | 5/2001 | Macrae et al. | |
| 6,237,049 B1 | 5/2001 | Ludtke | |
| 6,239,794 B1 | 5/2001 | Yuen et al. | |
| 6,240,555 B1 | 5/2001 | Shoff et al. | |
| 6,263,501 B1 | 7/2001 | Schein et al. | |
| 6,268,849 B1 | 7/2001 | Boyer et al. | |
| 6,310,886 B1 | 10/2001 | Barton | |
| 6,331,877 B1 | 12/2001 | Bennington et al. | |
| 6,354,378 B1 | 3/2002 | Patel | |
| 6,357,043 B1 | 3/2002 | Ellis et al. | |
| 6,367,080 B1 | 4/2002 | Enomoto et al. | |
| 6,388,714 B1 | 5/2002 | Schein et al. | |
| 6,397,080 B1 | 5/2002 | Viktorsson et al. | |
| 6,445,398 B1 | 9/2002 | Gerba et al. | |
| 6,463,585 B1 | 10/2002 | Hendricks et al. | |
| 6,509,908 B1 | 1/2003 | Croy et al. | |
| 6,530,083 B1 | 3/2003 | Liebenow | |
| 6,564,378 B1 | 5/2003 | Satterfield | |
| 6,597,374 B1 * | 7/2003 | Baker et al. | 715/717 |
| 6,611,654 B1 | 8/2003 | Shteyn | |
| 6,675,385 B1 | 1/2004 | Wang | |
| 6,704,028 B2 | 3/2004 | Wugofski | |
| 6,756,997 B1 | 6/2004 | Ward, III et al. | |
| 6,760,537 B2 | 7/2004 | Mankovitz | |
| 6,813,775 B1 | 11/2004 | Finseth et al. | |
| 6,837,789 B2 | 1/2005 | Garahi et al. | |
| 6,871,186 B1 | 3/2005 | Tuzhilin et al. | |
| 6,925,567 B1 | 8/2005 | Hirata et al. | |
| 6,927,806 B2 | 8/2005 | Chan | |
| 6,950,624 B2 | 9/2005 | Kim et al. | |
| 7,003,791 B2 * | 2/2006 | Mizutani | 725/21 |
| 7,020,704 B1 | 3/2006 | Lipscomb et al. | |
| 7,088,952 B1 * | 8/2006 | Saito et al. | 455/3.06 |
| 7,117,518 B1 | 10/2006 | Takahashi et al. | |
| 7,134,131 B1 | 11/2006 | Hendricks et al. | |
| 7,165,098 B1 | 1/2007 | Boyer et al. | |

| | | |
|---|---|---|
| 7,194,755 B1 | 3/2007 | Nakata et al. |
| 7,328,450 B2 | 2/2008 | Macrae et al. |
| 7,421,724 B2 | 9/2008 | Klosterman |
| 7,627,341 B2 | 12/2009 | Wu |
| 7,657,520 B2 * | 2/2010 | Chen et al. ............... 725/28 |
| 7,913,278 B2 * | 3/2011 | Ellis et al. ............... 725/37 |
| 8,006,263 B2 * | 8/2011 | Ellis et al. ............... 725/38 |
| 8,046,800 B2 * | 10/2011 | Daniels .................... 725/58 |
| 8,046,801 B2 * | 10/2011 | Ellis et al. ............... 725/58 |
| 8,132,209 B2 * | 3/2012 | Kaizu et al. ............... 725/51 |
| 2002/0032907 A1 | 3/2002 | Daniels |
| 2002/0046401 A1 * | 4/2002 | Miyazaki et al. ........... 725/32 |
| 2002/0046407 A1 * | 4/2002 | Franco ..................... 725/110 |
| 2002/0056087 A1 | 5/2002 | Berezowski et al. |
| 2002/0059596 A1 * | 5/2002 | Sano et al. ............... 725/39 |
| 2002/0087661 A1 | 7/2002 | Matichuk et al. |
| 2002/0100044 A1 * | 7/2002 | Daniels .................... 725/39 |
| 2002/0143629 A1 * | 10/2002 | Mineyama et al. ........... 705/14 |
| 2002/0174424 A1 | 11/2002 | Chang et al. |
| 2002/0174430 A1 * | 11/2002 | Ellis et al. ............... 725/46 |
| 2002/0194596 A1 | 12/2002 | Srivastava |
| 2003/0005445 A1 | 1/2003 | Schein et al. |
| 2003/0030751 A1 * | 2/2003 | Lupulescu et al. ........... 348/552 |
| 2003/0031465 A1 | 2/2003 | Blake |
| 2003/0061302 A1 * | 3/2003 | Fang ....................... 709/217 |
| 2003/0079227 A1 | 4/2003 | Knowles et al. |
| 2003/0084461 A1 | 5/2003 | Hoang |
| 2003/0097227 A1 | 5/2003 | Bloch et al. |
| 2003/0110499 A1 | 6/2003 | Knudson et al. |
| 2003/0149988 A1 * | 8/2003 | Ellis et al. ............... 725/87 |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0190149 A1 * | 10/2003 | Chang et al. ............... 386/83 |
| 2003/0196201 A1 | 10/2003 | Schein et al. |
| 2003/0198462 A1 | 10/2003 | Bumgardner et al. |
| 2003/0204856 A1 * | 10/2003 | Buxton .................... 725/120 |
| 2003/0208756 A1 | 11/2003 | Macrae et al. |
| 2004/0031051 A1 * | 2/2004 | Kim et al. ............... 725/58 |
| 2004/0103439 A1 | 5/2004 | Macrae |
| 2004/0168189 A1 * | 8/2004 | Reynolds et al. ........... 725/42 |
| 2005/0028208 A1 * | 2/2005 | Ellis et al. ............... 725/58 |
| 2005/0028218 A1 | 2/2005 | Blake |
| 2005/0033641 A1 | 2/2005 | Jha et al. |
| 2005/0120373 A1 | 6/2005 | Thomas et al. |
| 2005/0204388 A1 | 9/2005 | Knudson et al. |
| 2005/0251822 A1 | 11/2005 | Knowles et al. |
| 2005/0251827 A1 | 11/2005 | Ellis |
| 2006/0031883 A1 * | 2/2006 | Ellis et al. ............... 725/58 |
| 2006/0085825 A1 * | 4/2006 | Istvan et al. ............... 725/86 |
| 2006/0136966 A1 | 6/2006 | Folk |
| 2006/0184978 A1 * | 8/2006 | Casey ..................... 725/87 |
| 2006/0253874 A1 * | 11/2006 | Stark et al. ............... 725/62 |
| 2007/0043829 A1 * | 2/2007 | Dua ....................... 709/219 |
| 2007/0067805 A1 | 3/2007 | Macrae |
| 2007/0188902 A1 * | 8/2007 | Patron et al. ............... 360/31 |
| 2007/0204308 A1 | 8/2007 | Nicholas et al. |
| 2008/0010655 A1 | 1/2008 | Ellis et al. |
| 2008/0139193 A1 * | 6/2008 | Hao et al. ............... 455/420 |
| 2008/0148320 A1 | 6/2008 | Howcroft |
| 2008/0189737 A1 | 8/2008 | Ellis |
| 2008/0189742 A1 | 8/2008 | Ellis et al. |
| 2008/0189743 A1 | 8/2008 | Ellis et al. |
| 2008/0243641 A1 * | 10/2008 | Leno ....................... 705/27 |
| 2008/0263587 A1 | 10/2008 | DeBie |
| 2008/0320543 A1 * | 12/2008 | Wang et al. ............... 725/131 |

FOREIGN PATENT DOCUMENTS

| | | |
|---|---|---|
| DE | 44 31 438 | 3/1996 |
| DE | 195 02 922 | 8/1996 |
| DE | 19531121 | 2/1997 |
| DE | 19740079 | 3/1999 |
| EP | 0774853 | 5/1997 |
| EP | 0793225 | 9/1997 |
| EP | 0805594 | 11/1997 |
| EP | 1271952 | 1/2003 |
| GB | 2265792 | 10/1993 |
| GB | 2275800 | 9/1994 |
| JP | 03022770 | 1/1991 |
| JP | 08-56352 | 2/1996 |
| JP | 09-065300 | 3/1997 |
| JP | 09102827 | 4/1997 |
| JP | 09-120686 | 5/1997 |
| JP | 09-148994 | 6/1997 |
| JP | 09-162818 | 6/1997 |
| JP | 09-270965 | 10/1997 |
| JP | 09-298677 | 11/1997 |
| JP | 11-317937 | 11/1999 |
| WO | WO-87/03766 | 6/1987 |
| WO | WO-89/03085 | 4/1989 |
| WO | WO 91/07050 | 5/1991 |
| WO | WO-94/14282 | 6/1994 |
| WO | WO 94/15284 | 7/1994 |
| WO | WO-95/01056 | 1/1995 |
| WO | WO-95/01059 | 1/1995 |
| WO | WO-95/10910 | 4/1995 |
| WO | WO-95/28055 | 10/1995 |
| WO | WO-95/32585 | 11/1995 |
| WO | WO-96/07270 | 3/1996 |
| WO | WO-96/13932 | 5/1996 |
| WO | WO-96/20555 | 7/1996 |
| WO | WO 97/12486 | 4/1997 |
| WO | WO-97/13368 | 4/1997 |
| WO | WO 97/22207 | 6/1997 |
| WO | WO-97/31480 | 8/1997 |
| WO | WO 97/33434 | 9/1997 |
| WO | WO-97/36422 | 10/1997 |
| WO | WO-97/47106 | 12/1997 |
| WO | WO-97/47143 | 12/1997 |
| WO | WO-97/49237 | 12/1997 |
| WO | WO-97/50251 | 12/1997 |
| WO | WO-98/10589 | 3/1998 |
| WO | WO 98/10598 | 3/1998 |
| WO | WO-98/16062 | 4/1998 |
| WO | WO-98/17064 | 4/1998 |
| WO | WO-98/26584 | 6/1998 |
| WO | WO 98/56173 | 12/1998 |
| WO | WO 98/56176 | 12/1998 |
| WO | WO 99/04570 | 1/1999 |
| WO | WO-99/14947 | 3/1999 |
| WO | WO-99/30491 | 6/1999 |
| WO | WO 99/60783 | 11/1999 |
| WO | WO 2005/091626 | 9/2005 |

OTHER PUBLICATIONS

U.S. Appl. No. 09/492,713, filed Jan. 27, 2000, Forrer et al.
U.S. Appl. No. 11/324,202, filed Dec. 29, 2005, Yates.
"Why Jini Now?", from the internet at http://java.sun.com/products/jini/whitepapers/whyjininow.pdf, printed on Jan. 25, 1999. The document bears a copyright date of 1998.
Von Andreas Neumann, "WDR Online Aufbau Und Perspektiven Automatisierter Online-Dienste Im WDR," Rundfunktechnische Mitteilungen, vol. 41, pp. 56-66, Jun. 1997.
Von Gerhard Eitz, "Zukunftige Informations-Und Datenangebote Beim Digitalen Fernsehen—EPG Und "Lesezeichen"," Rundfunktechnische Mitteilungen, vol. 41, pp. 76-72, Apr. 30, 1997.
"Honey, is there anything good on the remote tonight?", advertisement from Multichannel News, Braodband Week Section, p. 168, Nov. 30, 1998.
"How Evolve Works," from the Internet at http://www.evolveproducts.com/network.html, printed on Dec. 28, 1998.
"Jini Architecture Overview," by Jim Waldo, from the Internet at http://Java.sun.com/products/jini/whitepapers/architectureoverview.pdf/ pinted on Jan. 25, 1999. The document bears a copyright date of 1998.
"Reaching your subscribers is a complex andcostly process-until now," from the Internet at http://www.evolveproducts.com/info.html, printed on Dec. 28, 1998.
Curt Rogers, "Telcos vs. Cable TV: The Global View," Data Communications, No. 13, New York, pp. 75, 76, 78 and 80, Sep. 1995.
"Sun's Next Steps in Digital Set-Tops," article in Cablevision, p. 56, Nov. 16, 1998.
"The Evolve EZ Guide. The Remote. Control," from the Internet at http://www.evolveproducts.com/display2.html, printed on Dec. 28, 1998.

"Using Starsight 2," published before Apr. 19, 1995.
"What is Jini?", from the Internet at http://java.sun.com/products/jini/whitepapers/whatsjini.pdf, printed on Jan. 25, 1999.
Jaidev, "EXSLT—A Wired and Wireless Case Study," http://csharpcomputing.com/XMLTutorial/Lession15.htm.
Randerson, J., "Let Sofware Catch the Game for You," New Scientist, Jul. 3, 2004.
Papers Delivered (Part1), 61st National Conference, Information Processing Society of Japan, Oct. 3-5, 2000.
Index Systems Inc., "Gemstar Service Object Model," Data Format Specification, Ver. 2.0.4, pp. 58-59.
Pogue, D., "State of the Art: For TiVo and Replay, New Reach," N.Y. Times, May 29, 2003.
Bach, U. et al., "Multimedia TV Set, Part 1" Radio-Fernsehen Elektronik (RFE), Sep. 1996, pp. 28 31. (English language translation attached.).
Bach, U. et al., "Multimedia TV Set, Part 2 and Conclusion," Radio-Fernsehen Elektronik (RFE), Oct. 1996, pp. 36-40. (English language translation attached.).
Office Action in relation to U.S. Appl. No. 11/600,944.
Office Action and Reply in relation to U.S. Appl. No. 11/788,669.
Office Action and Reply in relation to U.S. Appl. No. 11/851,571.
DiRosa, S. "Pinochle's BIGSURF Netguide", Jul. 1995, vol. 3.1, 27 pages.
Gus Venditto, Prodigy for Dummies, 1995, IDG Books, pp. 57-63 and 213.
Hirtz, G. et al:, "Open TV: Betriebssystem Fuer Interaktives Fernsehen," Fernseh Und Kinotechnik, de vde Verlag GMBH, Berlin, vol. 50, No. 3, Mar. 1. 1996, pp. 84-89, XP 000581417, ISSN: 0015-0142 (Translation, pp. 1-9).

* cited by examiner

SET RECORDING 800

Select and review the options below and press "Confirm" to submit your request.

| | |
|---|---|
| Name | Crocodile Hunter's Croc Files — 802 |
| Channel | 100 — 804 |
| Air Date | Monday, November 13 — 806 |
| Start Time | 2:00 PM — 808 |
| Duration | 30 minutes — 818 |
| Start Recording | On-time ▾ — 812 |
| Stop Recording | On-time ▾ — 814 |
| Save Until | Space is needed ▾ — 816 |

✓ CONFIRM — 810    ⊘ CANCEL — 820

FIG. 8A

SET REMINDER

850

Select and review the options below and press "Confirm" to submit your request.

| | |
|---|---|
| Name | Crocodile Hunter's Croc Files — 852 |
| Channel | 100 — 854 |
| Air Date | Monday, November 13 — 856 |
| Start Time | 2:00 PM — 858 |
| Duration | 30 minutes — 868 |
| Start Reminder | On-time — 862 |
| Stop Reminder | On-time — 864 |
| Save Reminder Until | End of Season — 866 |

CONFIRM — 860

CANCEL — 870

FIG. 8B

Figure 13B:
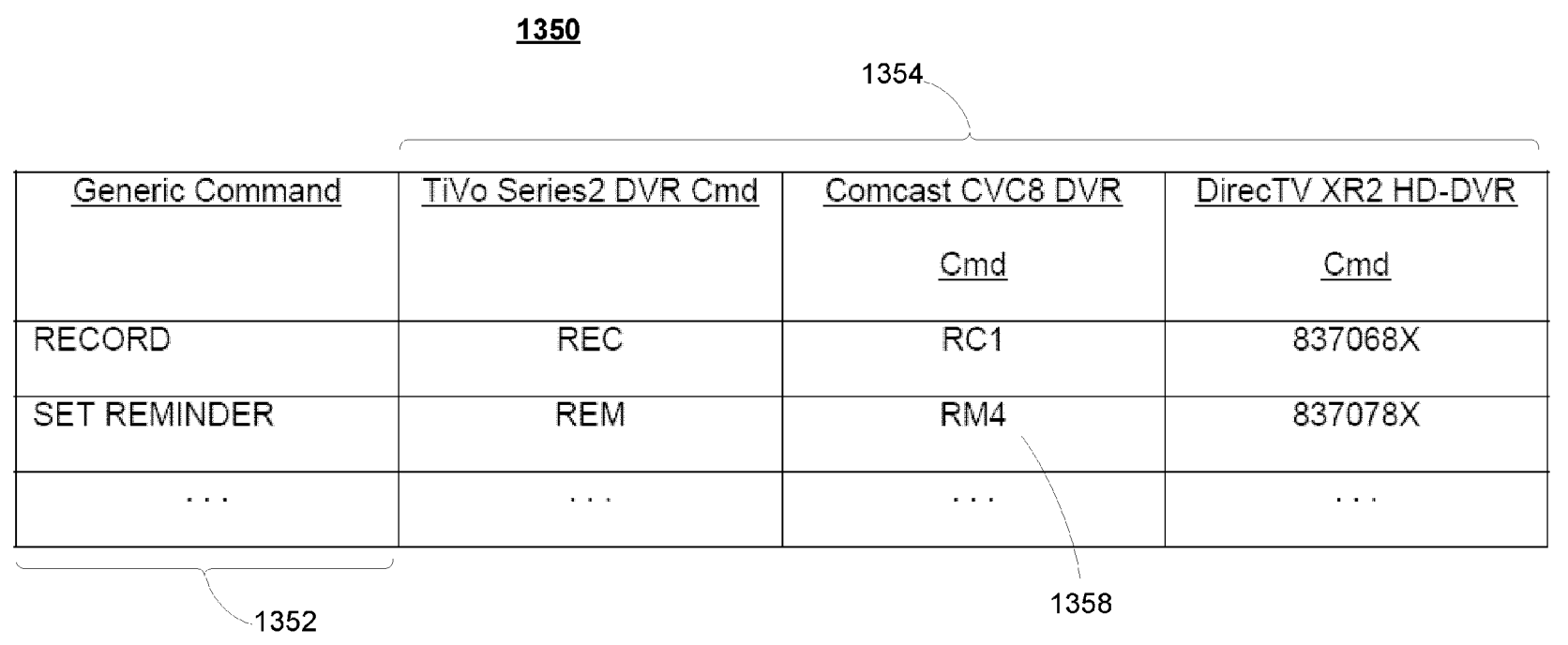

| Generic Command | TiVo Series2 DVR Cmd | Comcast CVC8 DVR Cmd | DirecTV XR2 HD-DVR Cmd |
|---|---|---|---|
| RECORD | REC | RC1 | 837068X |
| SET REMINDER | REM | RM4 | 837078X |
| ... | ... | ... | ... |

SYSTEMS AND METHODS FOR PROVIDING REMOTE PROGRAM ORDERING ON A USER DEVICE VIA A WEB SERVER

BACKGROUND OF THE INVENTION

This invention relates generally to media systems, and more particularly, to systems and methods for providing remote program ordering on a user device via a web server.

Recent advances in media communications technology have made it possible for users to access interactive media guidance applications implemented on user equipment without being in physical proximity to the user equipment. For example, users of interactive media guidance applications in some systems may remotely schedule recordings of television programs. In such systems, the user's set-top box is coupled to a remote program guide access server through a communications network. When away from home, the user may connect to the remote access server (or an intermediate server such as a web server) through a device, such as a personal computer, to remotely schedule recording with the interactive media guidance application on the user's in-home set-top box.

In some cases, a user may want to be able to access more than one set-top box, for example, if they have more than one television at home, each with its own set-top box. Each set-top box may be remotely accessible, however, the remote access server for one set-top box may not be compatible with the interactive media guidance application of another set-top box (e.g., if the boxes have different application program interfaces), requiring the user to connect to multiple remote access servers to access the multiple set-top boxes. In some cases, a user may prefer to use a particular remote access server for accessing set-top boxes, in which case it would be desirable if the remote access server could access different types of set-top boxes regardless of vendor, model, or other characteristics of set-top boxes.

SUMMARY OF THE INVENTION

In view of the foregoing, it would be desirable to provide remote access systems and methods that support algorithms and techniques for facilitating the communication of requests initiated at remote locations for transmittal to interactive media guidance applications. In particular, it would be desirable to provide a remote access system capable of communicating record requests to multiple interactive media guidance applications.

In accordance with principles of the present invention, systems and methods for remotely ordering a program for access on user equipment implementing an interactive media guidance application are provided. In particular, a general remote access service for enabling communication and management of multiple user equipment devices, such as digital video recorders that may be from multiple vendors, is provided. A user may use the general remote access service to send requests, such as scheduling a recording, placing an order, or reminder or setting user preferences, either directly to the user equipment device (e.g., a digital video recorder located at an addressable internet protocol address) or to an intermediate server such as a service provider backend in communication with the user equipment device. The general remote access service may include a web server for receiving user requests, which are cross-referenced with action requests that are in a format compatible with the user equipment device and/or the intermediate server. The general remote access service may maintain a lookup table that cross-references user requests with action requests in a plurality of formats, each compatible with a different user equipment device. A particular format may be selected based on characteristics of the user equipment device, such as its vendor and/or model.

According to one aspect of the invention, a method for remotely accessing user equipment includes the steps of receiving user equipment identification information indicating at least one characteristic of the user equipment and receiving from a user device a user request indicating instructions for the user equipment. The user request is cross-referenced with an action request in a user equipment format selected from a plurality of formats to be compatible with the user equipment. The action request in the user equipment format is transmitted for receipt by the user equipment for enabling execution of the indicated instructions.

According to another aspect of the invention, a program advertised on a web page of a website provided by a web server is scheduled for recording using a remote access server. This allows the user to browse websites on the Internet and when presented with a program advertisement of interest on a particular website, the user may schedule the advertised program for recording seamlessly without being required to provide any further input or being browsed away to a different website (to schedule the program for recording). In particular, a program advertisement may be displayed on a user device. In response to a user's selection of the advertisement, information may be transmitted from the user device to a web server of the web page without navigating the user away from the website. The information transmitted by the user device may include information that identifies a user's equipment to a remote access server. The information may be stored in a cookie on the user device. A record request may be transmitted by the web server to the remote access server. The remote access server may cross-reference the record request with an action request. The action request may be transmitted by the remote access server to the user's television equipment to instruct the user's television equipment to schedule the advertised program for recording.

According to another aspect of the invention, a program advertised on a web page of a website provided by a web server is ordered from a remote access server. This allows the user to browse websites on the Internet and when presented with a program advertisement of interest on a particular website, the user may order the advertised program, for accessing on user equipment, seamlessly without being required to provide any further input or being browsed away to a different website (to place an order for the program). In particular, a program advertisement may be displayed on a user device. In response to a user's selection of the advertisement, information may be transmitted from the user device to a web server of the web page without navigating the user away from the website. The information transmitted by the user device may include information that identifies a user's equipment to a remote access server and may also include payment information for ordering the advertised program. The information may be stored in a cookie on the user device. An order request may be transmitted by the web server to the remote access server. The remote access server may deduct funds using the payment information and may cross-reference the order request with an action request. The action request may be transmitted by the remote access server to the user's television equipment to remove access restrictions from the advertised program and allow the user's television equipment to access the advertised program.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 6-10A and 10B are illustrative web-based remote access service screens in accordance with another embodiment of the invention;

FIGS. 13A, 14-18A and 18B are illustrative process flowcharts of steps involved in providing remote access to interactive media guidance applications in accordance with another embodiment of the invention; and FIG. 13B is an illustrative lookup table that can be used in conjunction with the processes depicted in FIGS. 13A and 14-17 in accordance with another embodiment of the invention.

DETAILED DESCRIPTION OF THE DISCLOSURE

Figure 1:
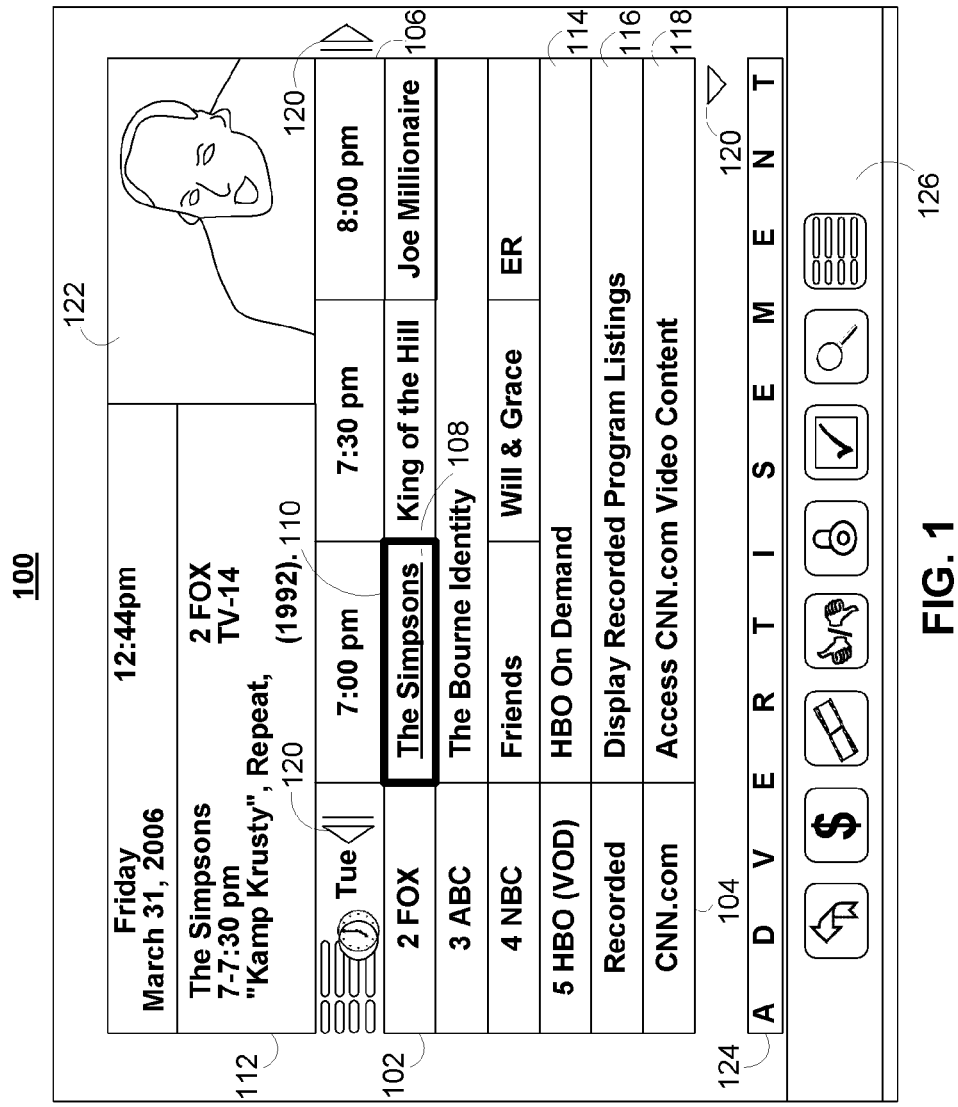
FIGS. 1 and 2 show illustrative display screens that may be used to provide media guidance application listings in accordance with an embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users. FIGS. 1, 2, and 6-10 show illustrative display screens that may be used to provide media guidance, and in particular media listings. The display screens shown in FIGS. 1, 2, and 6-10 may be implemented on any suitable device or platform. While the displays of FIGS. 1, 2, and 6-10 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet website or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other websites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. Pat. No. 7,165,098, and Ellis et al., U.S. patent application Ser. No. 10/105,128, filed Feb. 21, 2002, which are hereby incorporated by reference herein in their entireties.

Figure 2:
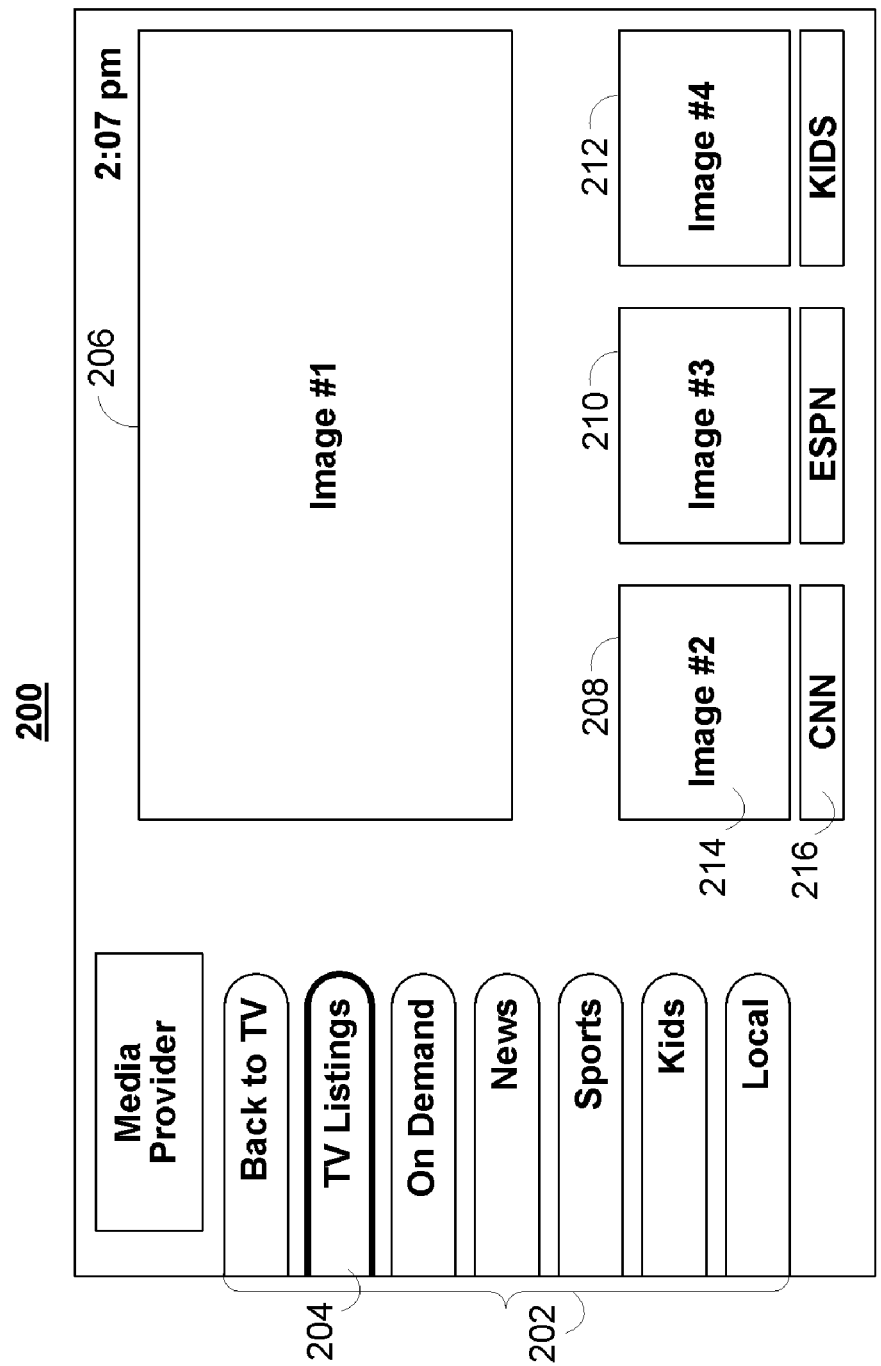

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
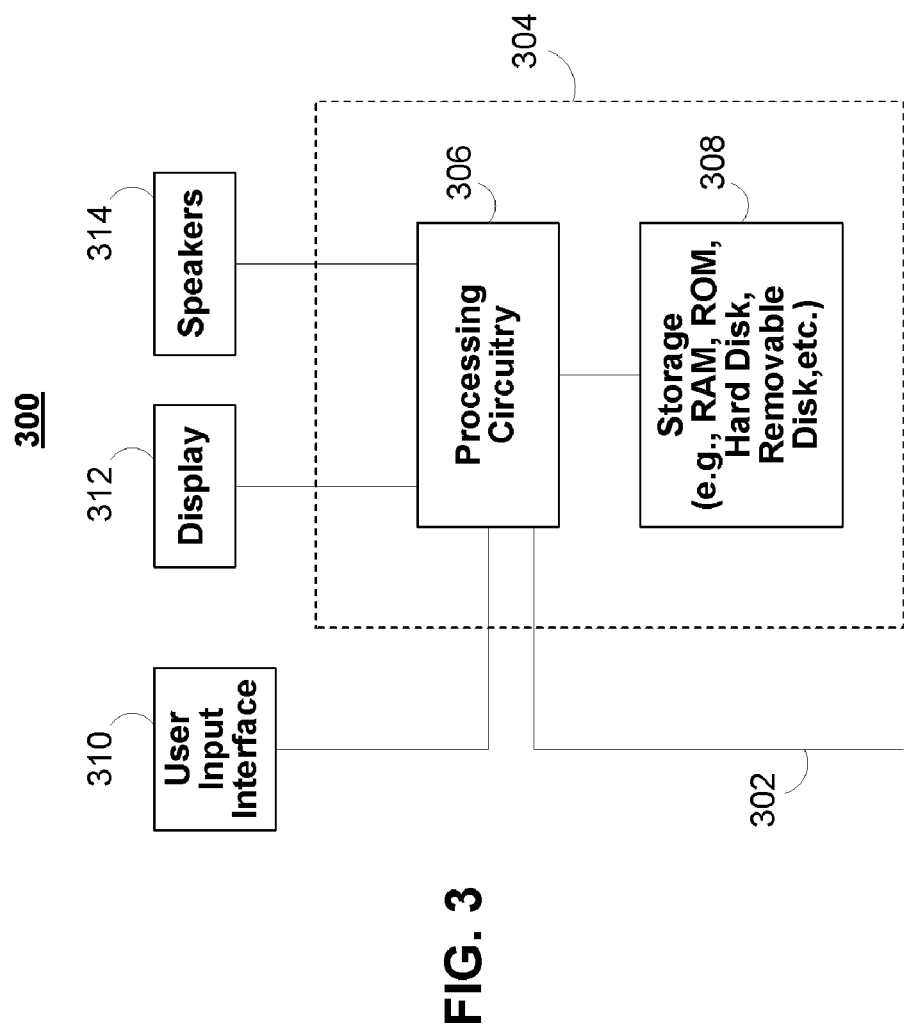
FIG. 3 shows an illustrative user equipment device in accordance with another embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIGS. 4 and 5. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIGS. 4 and 5). Communication circuitry may include an application program interface for receiving communications from other equipment. These communications may be action requests that indicate instructions for user equipment device 300, for example, a file compatible with the application program interface indicating instructions to schedule a recording, placing an order or settings for a media guidance application such as program or channel favorites (described below with respect to FIGS. 4 and 5). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
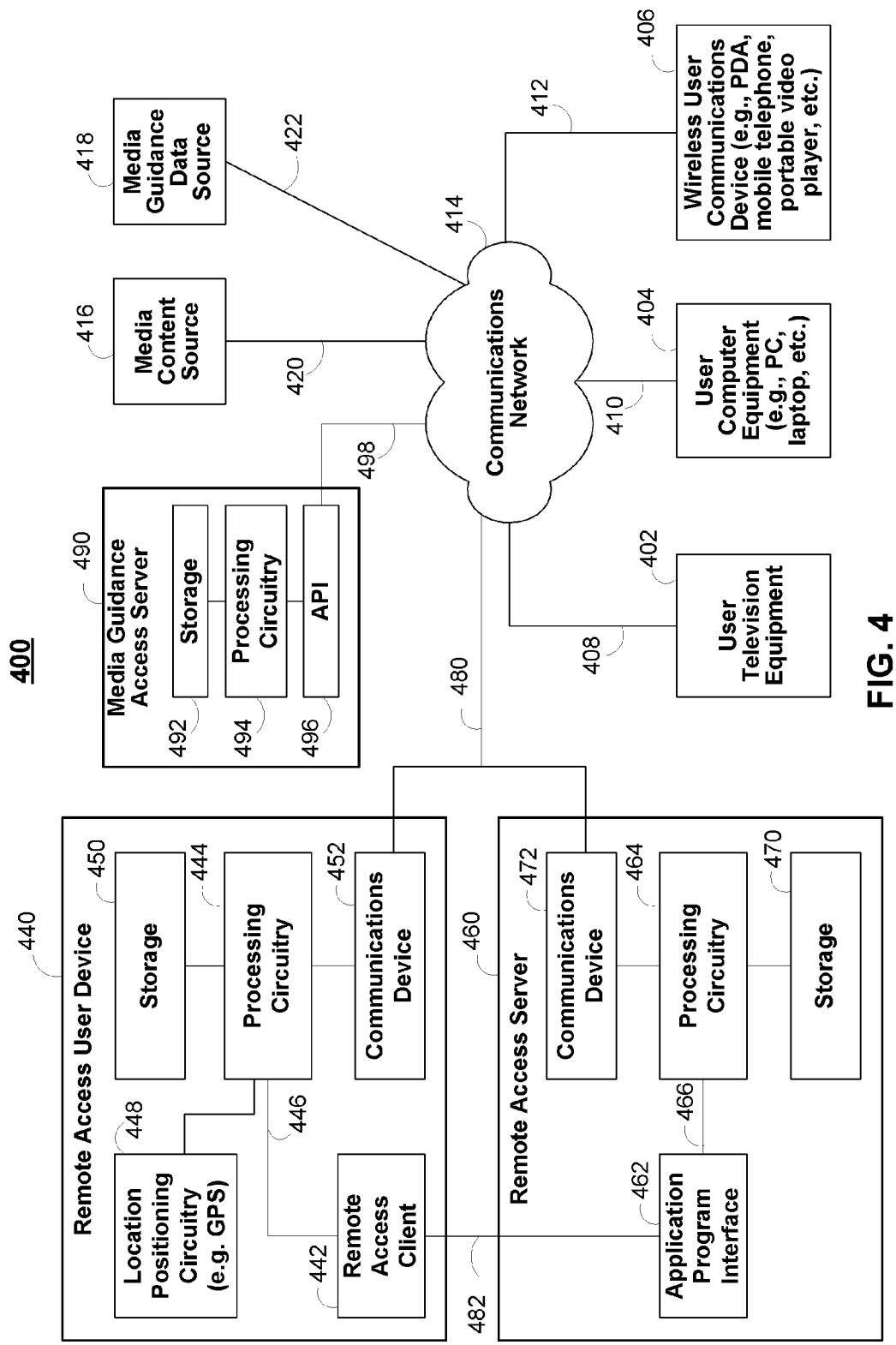
FIG. 4 is a diagram of an illustrative cross-platform interactive media system in accordance with another embodiment of the invention.
Figure 5:
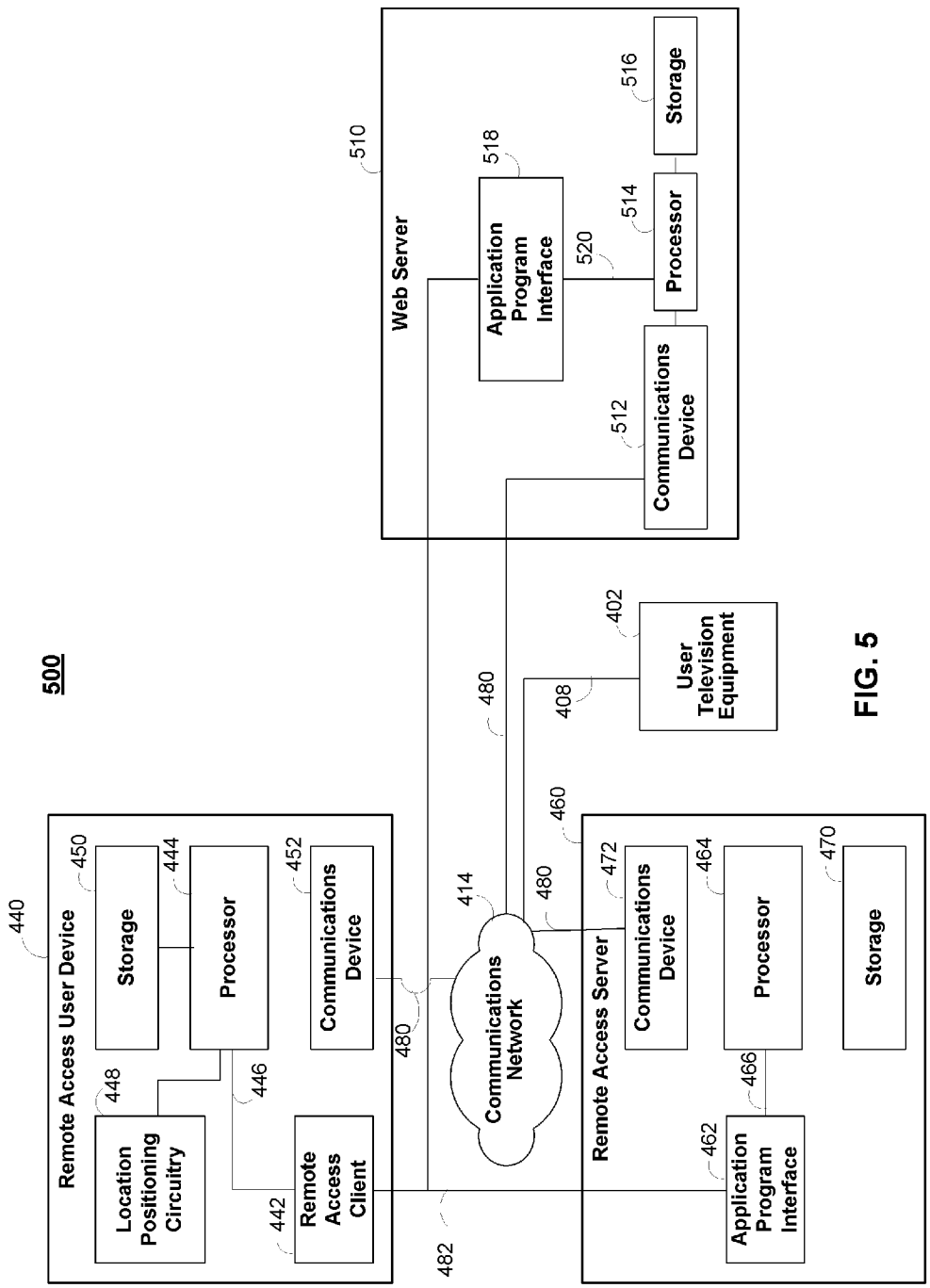
FIG. 5 is a diagram of an illustrative cross-platform interactive media system using a web server in accordance with another embodiment of the invention.

User equipment device 300 of FIG. 3 can be implemented in system 400 of FIGS. 4 and 5 as user television equipment 402, user computer equipment 404, wireless user communications device 406, remote access user device 440, or any other type of user equipment suitable for accessing media (e.g., a non-portable gaming machine). For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below. The remote access user device 440 may also be any of the wireless user devices 406 (e.g., a PDA, mobile telephone, portable video player, etc).

System 400 is a simplified illustrative cross-platform interactive media system for providing remote access to interactive media guidance applications in accordance with one embodiment of the present invention. This exemplary system comprises remote access user device 440, remote access server 460, media service provider's remote access server 490, user equipment devices 402, 404, and 406, media content source 416, and media guidance data content source 418 as well as various communication networks and data links. In this exemplary figure, interactive media system 400 may host the media guidance application that a user of remote access user device 440 may wish to manage remotely through use of remote access server 460 and remote access user device 440.

In interactive media system 400, user television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a website accessed by a web browser. In another example, the guidance application may be scaled down for wireless user communications devices.

In interactive media system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.tvguide.com on their personal computer at their office using, say, remote access user device 440, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

In interactive media system 400, the user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 414.

Interactive media system 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 (FIG. 3) of user equipment device 300 (FIG. 3) and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance within a home network or over a media service provider network. Media guidance system 400 may be applied in any one or a subset of these approaches, or in a system employing other approaches for delivering media and providing media guidance.

In one approach, user equipment devices 402, 404, and 406 may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In another approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

In another approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, placing orders, reminders, or other settings) on the online guidance application to control the user's in-home equipment. The user may have multiple in-home equipment devices (e.g., in different rooms of a home or at multiple homes) that may not necessarily be the same type. For example, a vendor may offer different devices and different vendors may offer different devices, where devices may differ by having different communication interfaces (e.g., different application program interfaces) for receiving data such as media content, in-home equipment settings, and action requests. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In one embodiment of the present invention, users may remotely access and manage settings for interactive guidance applications implemented on user equipment devices 402, 404, and/or 406 using any suitable remote access user devices. Remote access user device 440 of system 400 shows a simplified illustrative embodiment of a remote access user device. More specific embodiments of remote access user device 440 are described below. In some embodiments, remote access user device 440 is a standard user device and may include a PC, a laptop, a tablet, a personal digital assistant (PDA), a mobile telephone, a portable video player, a portable music player, a portable gaming machine, a handheld computer, a portable television system, an automobile television system, other computer equipment, other wireless device, or other mobile user device having location positioning functionality. Remote access user device 440 may be a user device outside the user's home network (e.g., office computer) or any of user equipment device 406 within the user's home network.

Remote access user device 440 may include one or more of processing circuitry 444, storage 450, communications device 452, and remote access client 442 (which is actually an application run by processing circuitry 444 and stored on storage 450, but has been drawn as a separate element for clarity). Processing circuitry 444 may include all the features and components of processing circuitry 306 in FIG. 3. Storage 450, which is coupled to processing circuitry 444, may include memory (e.g., random-access memory, read-only memory, flash memory, or any other suitable memory), hard drives, optical drives, or any other suitable fixed or removable storage devices (e.g., floppy disk, CD, DVD, cassette, or any suitable recording or storage device).

Remote access user device 440 may also include location positioning circuitry 448 coupled to processing circuitry 444. Location positioning circuitry 448 may provide location positioning functionality through, for example, a global positioning system (GPS), or any other suitable means. Location positioning circuitry 448 may supply processing circuitry 444 with the current location of the user, which may determine which of a plurality of remote access servers 460 remote access user device 440 may communicate with. The current location of the user may also determine the source of program information provided by remote access server 460 to remote access user device 440.

Remote access user device 440 may also include one or more communications device 452. Communications device 452 may be any device suitable for supporting communications between remote access user device 440, remote access server 460 and communications network 480, such as a communication port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, or other suitable analog or digital transceiver), or other suitable communications device.

Communication between remote access user device 440 and remote access server 460 may take place over communications path 482 and/or via communications network 480 using communications device 452. Communications path 482 may include any of the communication paths described above in connection with paths 408, 410, and 412.

Communications path 482 may include any suitable transmission medium. For example, communications path 482 may include a serial or parallel cable, a dial-up telephone line, a computer network or Internet link (e.g., 10Base2, 10Base 5, 10BaseT, 100BaseT, 10BaseF, T1, T3, etc.), an in-home network link, an infrared link, a radio frequency link, a satellite link, any other suitable transmission link or suitable combination of such links. Any suitable transmission or access scheme may be used such as standard serial or parallel communications, Ethernet, Token Ring, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), any other suitable transmission or access scheme, or any suitable combination thereof. Preferably remote access link 482 is bidirectional. If desired, however, certain limited program guide functions may be accessed using a unidirectional link. An advantage of using a unidirectional scheme for link 482 is that such schemes are generally less complicated and less expensive than bidirectional links.

Remote access user device 440 and remote access server 460 may communicate over communication path 482 using any suitable network and transport layer protocols, if desired. Remote access user device 440 and remote access server 460 may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, or any other suitable network and transport layer protocols or combination of protocols.

Remote access user device 440 may include remote access client 442 for communicating requests to and receiving responses from remote access server 460. It should be noted that remote access client 442 is actually an application run by processing circuitry 444 and stored on storage 450, but has been drawn as a separate element for clarity. Remote access client 442 may be accessed by users using one or more user input interfaces (not shown). Any suitable user input interface may be used to access remote access client 442, such as those described in connection with user input interface 310 of FIG. 3. Remote access client 442 may communicate with application program interface (API) 462 of remote server 460 using any suitable communications scheme. In addition to using any of the already mentioned protocols, any number of other access, data-link, network, routing or other protocols may be involved in supporting communications between remote program guide access device 440 and remote access server 460 over remote access link 482 and communications network 480 (e.g., X.25, Frame Relay, Asynchronous Transfer Mode (ATM), Serial Line Interface (SLIP), point-to-point protocols (PPP), or any other suitable access, data-link, network, routing or other protocol).

It should be noted that communications between remote access user device 440 and remote access server 460 may occur over one or more communications paths, but are shown as a single path in FIG. 4 to avoid overcomplicating the drawing. In addition, there may be more than one of remote access user device 440, but only one of each is shown in FIGS. 4 and 5 to avoid overcomplicating the drawing. Although communication between remote access user device 440 and remote access server 460 is shown as direct communications path 482, in some embodiments, remote access user device 440 may communicate with remote access server 460 through intermediate devices (not shown) such as those described above in connection with paths between media content source 416 and media guidance data source 418, and user equipment 402, 404, and 406. Remote access server 460 may also run on an intermediate server, such as a web server (described in more detail in connection with FIG. 5).

Remote access server 460 of media guidance system 400 is a simplified illustrative embodiment of a remote access server that may be used in accordance with the principles of this invention. Remote access server 460 may include one or more processing circuitry 464, storage 470, communications device 472, and application program interface (API) 462 (which is actually an application run by processing circuitry 464 and stored on storage 470, but has been drawn as a separate element for clarity). Remote access server 460 may be any suitable combination of hardware and software capable of client-server based interactions with remote access user device 440. Remote access server 460 may, for example, receive user requests from remote access user device 440 and generate action requests to be transmitted for processing. In some embodiments, remote access server 460 may run a suitable database engine, such as a SQL server or Oracle DB, and provide program guide data in response to queries generated by remote access user device 440. Processing circuitry 464 may include any suitable processor, such as a microprocessor or group of microprocessors, and other processing circuitry such as caching circuitry, direct memory access (DMA) circuitry, and input/output (I/O) circuitry. Storage 470 may include any suitable storage device including memory or other storage devices, such as random access memory (RAM), read only memory (ROM), flash memory, and a hard disk drive, that is suitable for storing the program guide data to be used by the remote access server. Program guide data may be stored on storage device 470 in any suitable format (e.g., a Structured Query Language (SQL) database). Storage 470 may also store user profile information for correlating users with their respective user equipment devices. Storage 470 may included several levels of primary, secondary, and auxiliary storage. Although storage 470 is shown in direct connection with processing circuitry 464, in some embodiments, at least a portion or all of storage 470 may be located on a separate data server remote from remote access server 460. Communications device 472 may be any suitable communications device such as those described in connection with communications device 452. Media guidance system 400 may include multiple remote access servers 460. However, only one is shown to avoid overcomplicating the drawing.

Media guidance access server 490 of media guidance system 400 is a simplified illustrative embodiment of an access server for a media service provider of media guidance system 400 that may be used in accordance with the principles of this invention. Media guidance access server 490 may include one or more processing circuitry 494, storage 492, communications device (not shown), and application program interface (API) 496 (which is actually an application run by processing circuitry 494 and stored on storage 492, but has been drawn as a separate element for clarity). Media guidance access server 490 may be any suitable combination of hardware and software capable of interactions with media guidance data source 418, user equipment devices 402, 404, and 406, and remote access server 460. Media guidance access server 490 may, for example, receive user requests from remote access server 460 for subsequent transmission to user equipment devices 402, 404, and/or 406 for processing. In some embodiments, media guidance access server 490 may run a suitable database engine, such as a SQL server or Oracle DB, and provide program guide data in response to queries generated by remote access server 460. Processing circuitry 494 may include any suitable processor, such as a microprocessor or group of microprocessors, and other processing circuitry such as caching circuitry, direct memory access (DMA) circuitry, and input/output (I/O) circuitry.

Storage 492 may include any suitable storage device including memory or other storage devices, such as random access memory (RAM), read only memory (ROM), flash memory, and a hard disk drive, that is suitable for storing data. In a typical usage scenario, media guidance access server 490 obtains media guidance data from media guidance data source 418. In some embodiments, media guidance access server 490 may store or cache the media guidance data obtained from media guidance data source 418 on storage device 492 in any suitable format (e.g., a Structured Query Language (SQL) database). Storage 492 may also store action requests received from remote access server 460. Storage 492 may included several levels of primary, secondary, and auxiliary storage. Although storage 492 is shown in direct connection with processing circuitry 494, in some embodiments, at least a portion or all of storage 492 may be located on a separate data server remote from media guidance access server 490. Media guidance access server 490 may also include communications device (not shown) that may be any suitable communications device such as those described in connection with communications device 452. Media guidance system 400 may include multiple media guidance access servers 490. However, only one is shown to avoid overcomplicating the drawing.

Cross-platform media guidance system 400 is intended to illustrate a number of approaches, or network configurations, by which user equipment devices, sources of media content and guidance data, and remote access service providers may communicate with each other for the purpose of providing remote access to media guidance applications. The present invention may be applied in any one or a subset of these approaches, or in a system employing other approaches for delivering media and providing media guidance.

In one illustrative usage scenario, a user at remote access user device 440 authenticates with remote access client 442. Using the remote access client 442, the user may select a program to be recorded on the user's in-home user equipment. For example, in FIG. 6 (which will be described in more detail below), a user may select "The Crocodile Hunter," on channel 100, starting at 2:00 PM to be recorded on the user equipment. After the user confirms the selection on FIG. 8A (which will be described in more detail below), the remote access user device 440 or the remote access server 460, may generate a request to be transmitted, either directly or through intermediate devices, for processing by the interactive media guidance application on user equipment 402, 404, or 406 (all of FIG. 4).

FIG. 5 is a diagram of an illustrative cross-platform interactive media system 500 using a web server in accordance with another embodiment of the invention. System 500 is similar to system 400 and is similarly labeled. System 500 provides a detailed illustration of some system components used when a web server 510 is used to provide remote access including scheduling a program for recording and placing an order for a program on a user television equipment. Some components from system 400 are not illustrated in system 500 for the sake of clarity, however it should be understood that any component in system 500 may communicate with components shown in system 400 over communications network 414.

It should be understood that an order for a program is necessary when a particular program requires a specific order request to enable access to the program on user equipment 402. For example, a pay-per-view program may require the user to place an order to enable the user equipment device to access the program. Also, there may be other programs with various access restrictions (such as by way of encryptions) that require a specific order request to enable access. Once the order request is made, the user equipment may access the particular program by applying to the program a decryption sequence or an access key provided by media guidance data source 418. In the case of a pay-per-view program, an order request may cause funds to be deducted from an account (e.g., a user's account) prior to removing access restrictions or granting access to the program.

In some embodiments, web server 510 may provide user device 440 with a web page that may include an advertisement for a program. Web server 510 may include a communications device 512, a processor 514, a storage unit 516, and an application program interface 518. Web server 510 may receive a request from user device 440 to access a website. The request may be transmitted from user device 440 via communications network 414 to communications device 512 of web server 510. When web server 510 receives the request from user device 440, application program interface 518 may cause processor 514 to retrieve from storage 516 a web page (associated with the website) that may include an advertisement for a program. The advertised program may be one that is provided by media content source 416 (FIG. 4). The web page corresponding to the website may be transmitted from web server 510 to user device 440 via communications network 414.

The user device may receive the website and may display the contents of the website including the advertisement for the program on a display screen (not shown). An exemplary display screen of the website including the advertisement for the program is shown and described in connection with FIGS. 9 and 10.

The user of user device 440 may interact with the displayed website by way of a cursor. The user may desire to view or access the advertised program. For example, the advertised program may be a show that is available to any subscriber of the television service and may be aired on a particular station at a particular time. In such a scenario, the user may select the advertisement (or position the cursor over the advertisement and click the region). Upon selection of the advertisement, system 500 causes the user's television equipment 402 to schedule the program for recording.

In another embodiment, the advertised program may be a show that has access restrictions and requires a specific order request to access. In such a scenario, the user may select the advertisement (or position the cursor over the advertisement and click the region). Upon selection of the advertisement, system 500 places an order for the advertised program and provides the user's television equipment 402 with access to the program.

In some embodiments, in response to the user's selection of the advertised program, user device 440 retrieves from storage 450 information about the user. Such information may be stored in a cookie and may include user equipment identification information indicating at least one characteristic of the user equipment. A characteristic of the user equipment includes, for example, a vendor of the user equipment, a model of the user equipment, a name of the user, a telephone number of the user, a unique identifier, a home address of the user, a MAC address associated with the user equipment, or an addressable internet protocol address associated with the user equipment. Processor 444 packages the retrieved information and transmits the user request through communications device 452 to web server 510. If the advertised program requires an order request, processor 444 may additionally retrieve from storage 450 funding information associated with the user. The funding information may be a credit card or some other form of payment that may be required to allow the user access to the advertised program.

It is important to note, that the selection of the advertisement on the user equipment does not navigate user device 440 to another website. Selection of the advertisement, however, may introduce a pop-up screen or navigate to a different web page that may include further information about the advertised program. Further information may include a description of the program or other broadcast times. The web page that may be displayed is still associated with the particular website that the user is browsing (e.g., MySpace.com).

Web server 510 may receive the user's request and information and may transmit a record request to record the advertised program to remote access server 460 via communications network 414. The record request may include user equipment identification information received from user device 440 in addition to program information including the title, start time and channel of the advertised program. In some embodiments, the advertised program may require a specific order request (e.g., a pay-per-view program). Accordingly, web server 510 may transmit to remote access server 460 an order request instead of a record request to request access to the advertised program. The record request may include funding information for deducting funds that may be required to access the program.

As discussed above and below, remote access server 460, may cross-reference the record (or order) request with an action request in a user equipment format to be compatible with user equipment 402 associated with the user accessing the website. In the case of an order request, remote access server 460 may deduct funds using the information received form web server 510 from the user's account. For example, remote access server 460 may be TVGuide.com and the user may have an account on that website. The web server may host the website for MySpace.com and may transmit information received from user device 440 identifying the user's account to TVGuide.com (i.e., the remote access server).

It should be understood that an advertised program, as described above and below, may be an advertisement video that is viewable on a user equipment device. For example, a website may include an advertisement for an exclusive film about a particular product. In particular, a BMW website may include an online campaign that encourages viewers to select the advertisement or a region of the website to cause a 5 minute (or some other length) exclusive film or video about the BMW X-series to be downloaded to the user's DVR or television equipment. The user may then access the downloaded media at a later point in time. In some scenarios, it may be necessary for the web server (providing the website with the advertisement video) to transmit the video to remote access server 460 for appropriate download to the user equipment device. In particular, remote access server 460 may generate the necessary instructions based on the web server's request to allow the user equipment device to receive the selected advertisement video and provide access to the user at a later time. These instructions may be generated in a similar fashion as the instructions to schedule a recording for a particular program.

In some embodiments, remote access server 460 may determine whether the user has previously scheduled the advertised program for recording prior to instructing user television equipment 402 to record the advertised program. Processor 464 may retrieve from storage 470 a user profile which may include information about program previously scheduled for recording. Processor 464 may perform a comparison with program criteria of the advertised program. Program criteria may include a title, start time, channel, theme, or genre of the advertised program. If a match is found, remote access server 460 may transmit information to web server 510 indicating that the selected program has previously been scheduled for recording. Web server 510 may then cause a pop-up notification to be displayed on user device 440 (e.g., on top of the web page being browsed) indicating to the user that the program has previously been scheduled for recording.

It should be understood, that the determination of whether a program has previously been scheduled for recording may be performed alternatively by web server 510 or user device 440. For example, web server 510 may store a user profile and, in response to receiving a user's selection of an advertisement, may compare the advertised program criteria (discussed above) with previously scheduled programs' criteria. Performing this determination on web server 510 may prevent web server 510 from transmitting a record request to remote access server 460 which will not cause a program to be recorded because it already has been scheduled at a different point in time. Similarly, user device 440 may perform this determination. For example, user device 440 may compare the advertised program criteria with previously scheduled programs' criteria stored in storage 450. If a match is found, user device 440 may prevent the selected advertisement information and user information from being transmitted to web server 510 and remote access server 460.

It should be understood that similar functionality for determining whether a program has previously been scheduled for recording applies to determining whether a user has previously ordered a program. For example, an advertisement may be for a program requiring a specific order request, and that program may have previously been ordered by the user. System 500 may determine that the program has previously been ordered (similarly to the manner in which it determines whether the program has previously been recorded) and may display a message for the user on user device 440 indicating that the program has previously been ordered.

Remote access server 460 may transmit the action request in the user equipment format for receipt by user equipment 402 over communications network 414 for recording or providing access to the advertised program. For example, the action request may include instructions specific to the user equipment device (associated with the user browsing the website provided by web server 510) that instruct user equipment device 402 to schedule the advertised program for recording. Alternatively, the action request may include access information (e.g., a decryption sequence or an access key) specific to the user equipment device (associated with the user browsing the website provided by web server 510) that allow user equipment device 402 to access the advertised program. After user equipment device 402 has been instructed to record the advertised program (or has been provided with access rights to an ordered program), an acknowledgment may be provided by remote access server 460 to user device 440 or web server 510. The acknowledgement may be displayed for the user on device 440 to inform the user that the selection of the advertisement resulted in the program being scheduled for recording or rights being granted for accessing the program.

In some other embodiments, web server 510 may provide user device 440 with a web page associated with a website that includes an advertisement for a program. The advertisement may include a URL that allows the user to transmit a request to record or to order a program directly to remote access server 460 without the need to go through web server 510. For example, in response to the user's selection of the program advertisement on the web page, user device 440 may retrieve information (as discussed above) from storage 450 for transmission to remote access server 460. User device 440 may incorporate the retrieved information into the URL associated with the advertisement displayed on the web page. If the program requires an order request, additional information including funding for the advertised program may be retrieved. The URL including the advertised program and user information may be accessed and transmitted over communications network 414 to remote access server 460 without navigating the user to another website. As discussed above and below, remote access server 460 cross-references the record request or order request with an action request for transmission to user equipment 402.

In some embodiments, remote access server 460 may allow a host of web server 510 to customize the URL that is provided to a user device to permit more sophisticated scheduling instructions. For example, remote access server 460 may provide the host of web server 510 with a unique login to access remote access server 460 in order to program a particular function or URL. The function or URL that is programmed may cause, for example, one episode or an entire series of a program or some other advertised video to be recorded in response to a user's selection of the advertisement. For example, web server 510 may determine whether a particular program advertisement is to cause an entire series or just the advertised program to be scheduled for recording. Once the determination is made, web server 510 may generate the necessary URL (after the URL has been programmed into remote access server 460) and embed it into the advertisement that is displayed on the website. After the user selects the advertisement, the URL may be provided to remote access server 460 (either directly from the user device or through web server 510) and may cause one or more programs to be scheduled for recording on the user television equipment based on the sophisticated instructions that are called for by the URL. Such functionality allows remote access server 460 to regulate the number or types of web servers 510 and their hosts that are providing advertisements for programs on websites that cause the programs to be scheduled for recording. Additionally, regulating the number or types of web servers 510 and their hosts that are providing such functionality may allow remote access server 460 to track the number of selections (along with the websites from which they originate) that are made to the advertisements that are displayed on a particular website.

Accordingly, it has been shown how system 500 allows a user to select an advertisement from a website that is displayed on a web page and in response, either record or place an order to access the advertised program on the user's television equipment. The advertisement is provided to the user from a website that is different from one associated with remote access server 460. For example, the website may be MySpace.com while remote access server 460 may be TVGuide.com. The differences between the two websites may be that remote access server 460 may include processor 464 and API 462 that allows remote access server 460 to provide instructions for user television equipment 402 while web server 510 may include only API 518 that is specific to data associated with a website on web server 510. This allows any third party web server 510 to advertise programming to users and enable the users to record or order the advertised programs without requiring the users to navigate to a website belonging to remote access server 460 to perform the desired actions. Additionally, the user may continue to browse the website of web server 510 without being navigated to another website (e.g., one of remote access server 460) to record or order a particular program.

Figure 6:
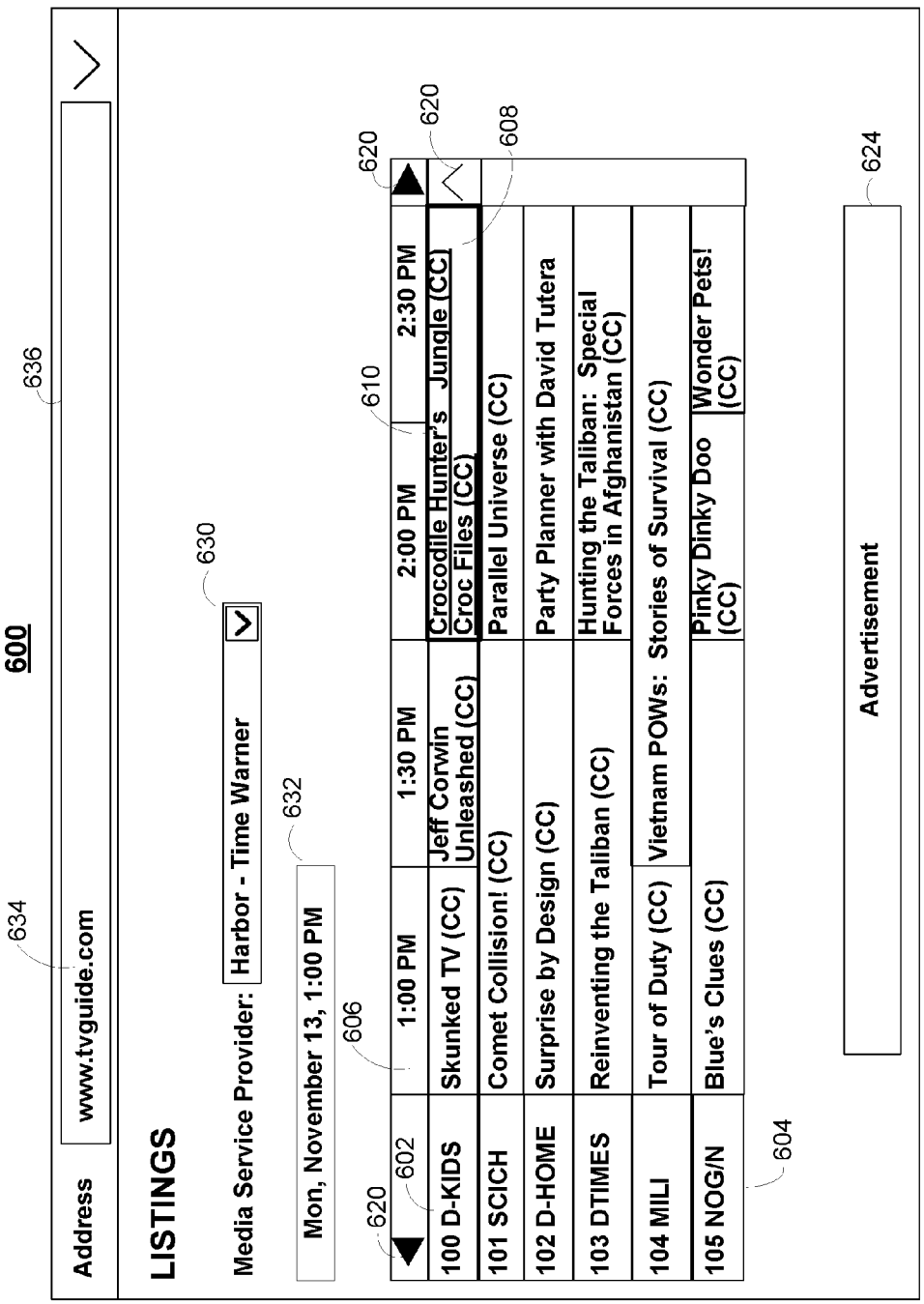

FIG. 6 shows illustrative grid program listings display 600 that may be included in an exemplary implementation of remote access client 442 described in connection with FIG. 4 in accordance with one embodiment of the invention. In some embodiments, a user enrollment process including one or more user enrollment screens (not shown) may be completed before accessing display 600 or any remote access functionality. In some embodiments, the interactive user enrollment process may also present a series of questions to the user relating to the user's viewing habits, viewing times, favorite programming, favorite actors, favorite series, or any other suitable information. The information collected via the user enrollment process may be stored as a user profile on the remote access server, remote access user device, user equipment devices, or at a remote location (e.g., any storage facility connected to communication network 480 of FIG. 4) and may be used to automatically recommend or advertise specific programs. In some embodiments, the remote access service may also actively monitor a user's viewing behavior and actions through remote access client 442 of FIG. 4. Information from this monitoring may be stored as part of the user's profile and may also be used to recommend or suggest programs.

Figure 7:
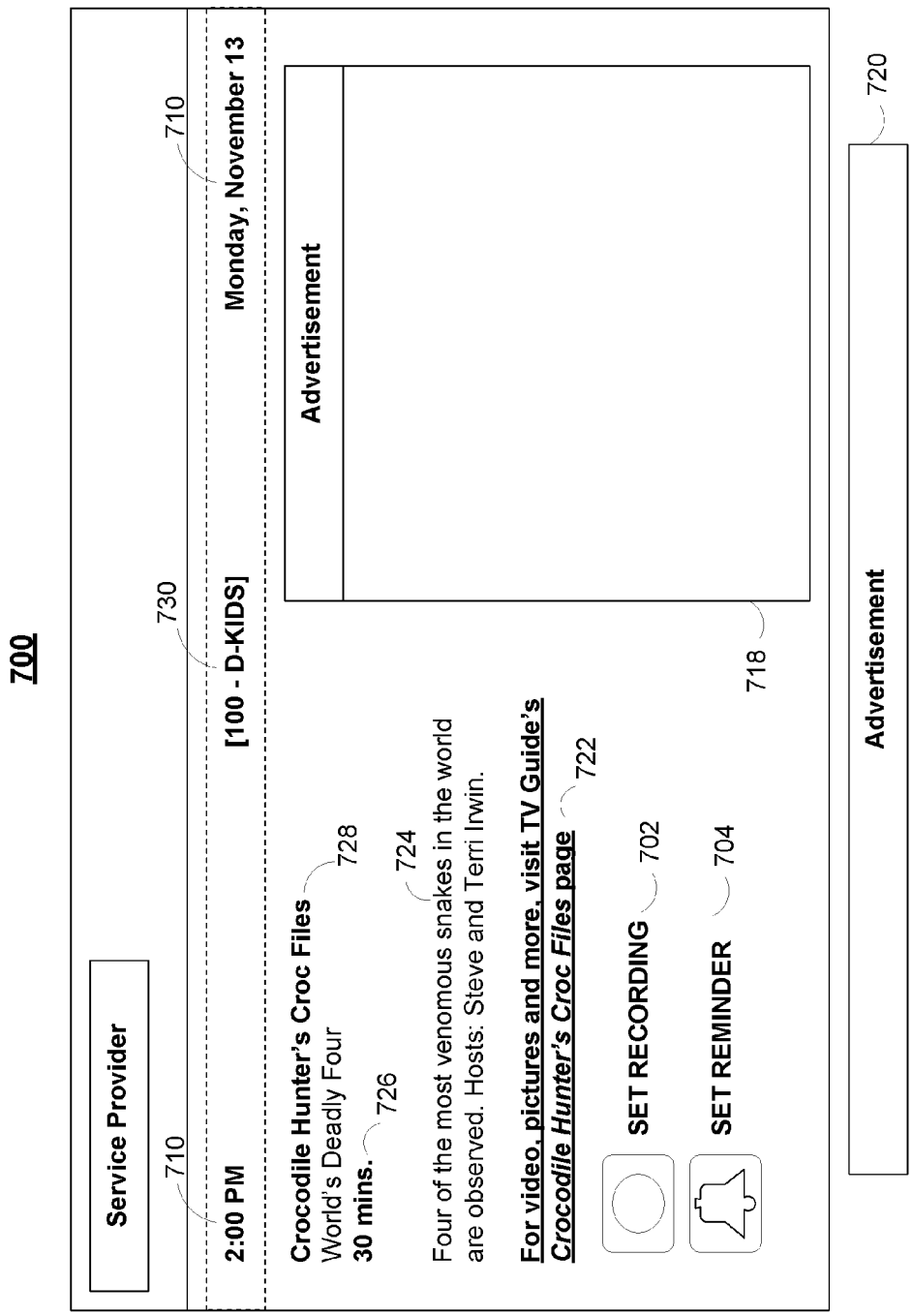

Each of the display screens in FIGS. 6-8 may include a number of banner advertisements 624 and panel advertisements (not shown). The size, shape, and location of the aforementioned advertisements may be altered without departing from the spirit of the invention, and more or less advertisements than those shown in FIGS. 6-8 may be displayed, if desired. A more detailed description of the advertisements is provided in connection with FIGS. 9-10.

Display 600 may include program information arranged by time and channel for providing remote access to interactive guidance application functions on user equipment. Display 600 may include grid 502 with: (1) a column of channel/media type identifiers 604, where each channel/media type identifier (which is a cell in the column) identifies a different channel or media type available; and (2) a row of time identifiers 606, where each time identifier (which is a cell in the row) identifies a time block of programming. Grid 502 also includes cells of program listings, such as program listing 608, where each listing provides the title of the program provided on the listing's associated channel and time. Display 600 also includes drop-down box 630 which may be used to select the media service provider for the geographical location of the user equipment. In some embodiments, the media server provider selected may be stored in the user profile information and displayed during remote access sessions. Display 600 also includes date/time menu 632 that a user of remote access client 442 (FIG. 4) may change. The media service provider, and the date and time selected by the user determine the program information displayed in grid 502. With a user input device, a user may select program listings by moving highlight region 610 of grid 502. A user may access display 600 via a remote service address 634, which may be, for example, a uniform resource identifier or locator that when entered into address box 636 may enable transmittal of data from a server, such as remote access server 460, to remote access client 442 for generating display 600.

FIG. 7 shows illustrative screen 700 for providing information relating to the program listing selected by highlight region 610 in FIG. 5. Screen 700 may include, for example, the program title 728, the program description 724, the starting time for the program 710, the channel on which the program is presented 730, the program's rating (not shown), and other desired program information, such as, for example access link 722. In some embodiments, screen 700 may also provide menu options for providing remote access to specific interactive guidance application functions.

For example, the user may select menu option 702 to remotely set up recording for the program on the in-home user equipment. FIG. 8A shows illustrative recording setup screen 800 that may be used by the user to remotely set up recording for the program according to one embodiment of the invention. Recording setup screen 800 may include, for example, the program title 802, the starting time 808, the channel 804, the program's duration 818, the program's rating (not shown), and other desired program information. In addition to displaying program information, screen 800 may also be used to define additional options for the recording. For example, the user may instruct the user equipment on which the recording is to be scheduled when to begin recording. Using drop-down box 812, the user may remotely instruct the interactive media guidance application to, for example, begin recording the program at it's scheduled start time or, alternatively, at some other user-determined time. Similarly, using drop-down box 814, the user may remotely instruct the user equipment to, for example, stop recording the program at it's scheduled stop time or, alternatively, at some other user-determined time. Using drop-down box 816, the user may also determine how long the user equipment may save the recorded program. The user may, for example, decide to save the recording until space is needed for new recordings or set a user-determined date when the recording may be removed or deleted by the user equipment. Although options 812 through 816 are depicted as drop-down boxes, any suitable input module may be used without departing from the spirit of the invention. For example, radio buttons may be used in one or more of options 812 through 816. After selecting and/or reviewing information for remotely setting up the recording, the use may confirm the recording or abort altogether. For example, the user may select menu item 810 to confirm the recording setup. Alternatively, the user may select menu item 820 to abort the recording setup. In some embodiments, the user may choose to save the recording setup on, for example, storage 470 of the remote access server for later confirmation or abandonment.

Returning to illustrative screen 700 in FIG. 7, the user may additionally or alternatively select menu option 704 to remotely set up a reminder for the program on the in-home user equipment. FIG. 8B shows illustrative reminder setup screen 850 that may be used by the user to remotely set up reminders for the program according to one embodiment of the invention. Reminder setup screen 850 may include, for example, the program title 852, the starting time 858, the channel 854, the program's duration 868, the program's rating (not shown), and other desired program information. In addition to displaying program information, screen 850 may also be used to define additional options for setting up the reminder. For example, the user may instruct the user equipment on which the reminder is to be scheduled when to display the reminder. Using menu item 862, the user may remotely instruct the user equipment to, for example, present the reminder for the program at its scheduled start time or, alternatively, at some other user-determined time. Similarly, using menu item 864, the user may remotely instruct the user equipment to, for example, stop reminding the program at its scheduled stop time or, alternatively, at some other user-determined time. Using menu item 866, the user may also determine how long the user equipment may keep the reminder active. The user may, for example, decide to keep the reminder active until the series completes its seasonal run, keep the reminder active for the specified episode only, or set a user-determined date when the reminder may be deactivated or deleted by the user equipment. After selecting and/or reviewing information for remotely setting up the reminder, the use may confirm the reminder or abort altogether. For example, the user may select menu item 860 to confirm the reminder setup. Alternatively, the user may select menu item 870 to abort the reminder setup. In some embodiments, the user may choose to save the reminder setup on, for example, storage 470 of the remote access server for later confirmation or abandonment.

After a user confirms a program action request, one or more action request definitions may be generated for the user's selection. For example, an action request definition may define the specific action that the user wishes to schedule (e.g., set up recording or set up reminder), the selected channel, selected start time, user client identification information, and any additional information that may be supported by the application program interface of the remote access server. The action request definition may be generated by remote access user device 440, remote access server 460 (both of FIG. 4), or by a hybrid approach in which the remote access user device generates a request based on user inputs (e.g., time and channel) and then sends the request to a remote access service which adds additional metadata (e.g., program identification information) to the request.

Figure 9A:
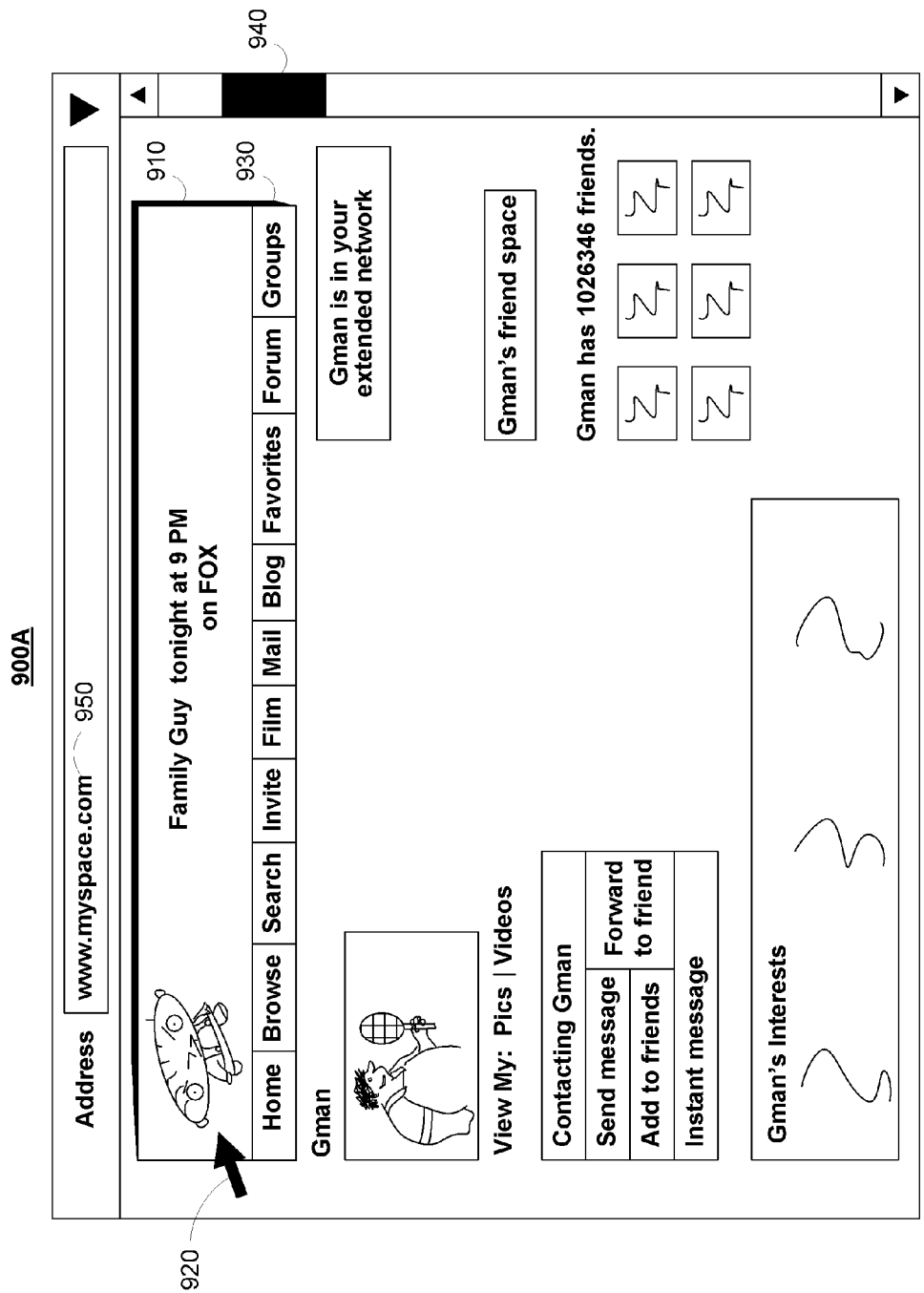
Figure 9B:
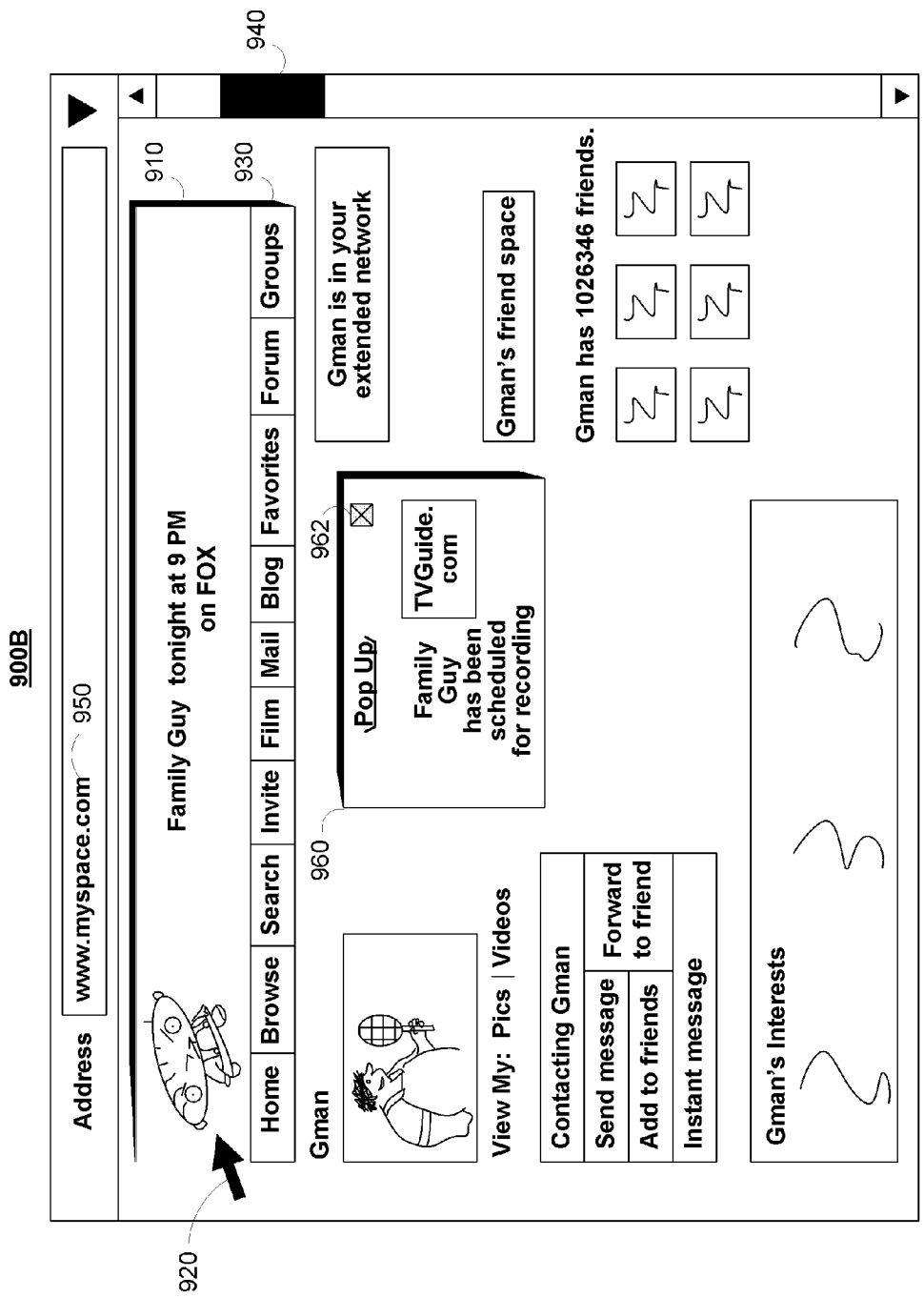

FIGS. 9A and 9B are illustrative web-based remote access service screens of a web page 900A or 900B of a website provided by web server 510 (FIG. 5) in accordance with another embodiment of the invention. Web page 900A may include an address bar 950, a program advertisement 910, a cursor 920, web page content 930 and scroll bar 940. As shown in FIG. 9A, the web page from website (e.g., MySpace.com) is displayed. The website address is provided in address bar 950. Selecting the various web page content 930 may navigate the user to different web pages associated with the particular website. The web pages may each be associated with the website shown on address bar 950. Cursor 920 may be positioned by the user over various portions of the displayed web page to make selections.

As shown in FIG. 9A, the user has positioned the cursor over the program advertisement 910. The program being advertised is a particular show (e.g., Family Guy) aired on a particular channel (e.g., FOX) at a particular time (e.g., 9 PM). The user may desire to record the advertised program. In response to the user selecting (e.g., clicking) program advertisement 910, user device 440 may retrieve information (as discussed above) from storage 450 (FIG. 5) and transmit the information to web server 510 (e.g., MySpace.com) indicating that the user selected the program advertisement 910. The information may be stored in a cookie on the user device.

In some circumstances, information may not be available on user device 440. In such scenarios, the user may be navigated away from website of web server 510 to a website belonging to remote access server 460. This may enable the user to create an account with remote access server 460 (e.g., TVGuide.com) and store information on the user device for use in future record (or order) requests. The account creation may require the user to provide remote access server 460 with information (e.g., a telephone number) to allow remote access server 460 to determine what is the user's television equipment. After remote access server 460 determines the user's television equipment, a cookie or information may be stored on user device 440. This information identifies the user's equipment to websites provided by web servers different from those of remote access server 460 and allows the user to record or order programs through those different websites.

Figure 11:
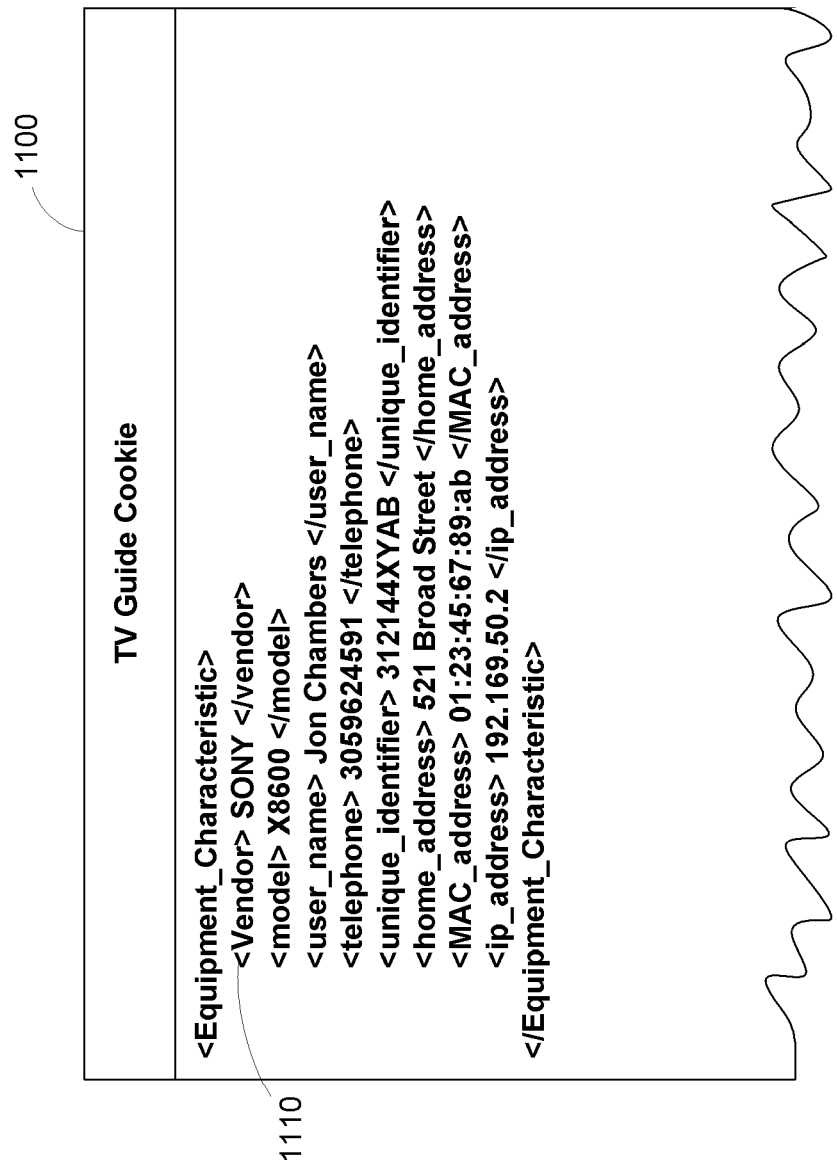
FIG. 11 is an illustrative display of information stored on a user device in accordance with another embodiment of the invention.

FIG. 11 shows an exemplary cookie 1100 which may be stored and retrieved from storage 450 of user device 440. Cookie 1100 may include fields 1110 indicative of the user's equipment. For example, fields 1110 may be a MAC address of the user's equipment. Web server 510 may provide the information contained in the cookie (or transmit the entire cookie) to remote access server 460 with the record (or order) request. Remote access server 460 may extract information about the user's television equipment from fields 1110 and cross-reference this information with an action request to instruct user equipment 402 to record or access an ordered program.

Web server 510 may transmit a record request (including information stored in the cookie or alternatively provided by user device 440) to remote access server 460 to record the advertised program. After cross-referencing the record request with an action request, remote access server 460 transmits the action request instructing the user television equipment to record the advertised program. As shown in FIG. 9B, after the program has been scheduled for recording on user equipment 402, a message 960 may be provided to the user on the web page 900B of website provided by web server 510. The message may include a close option 962 to allow the user to remove the message from the display. Alternatively, the message may be programmed to disappear from the display after a predetermined period of time (e.g., 25 seconds).

Figure 10A:
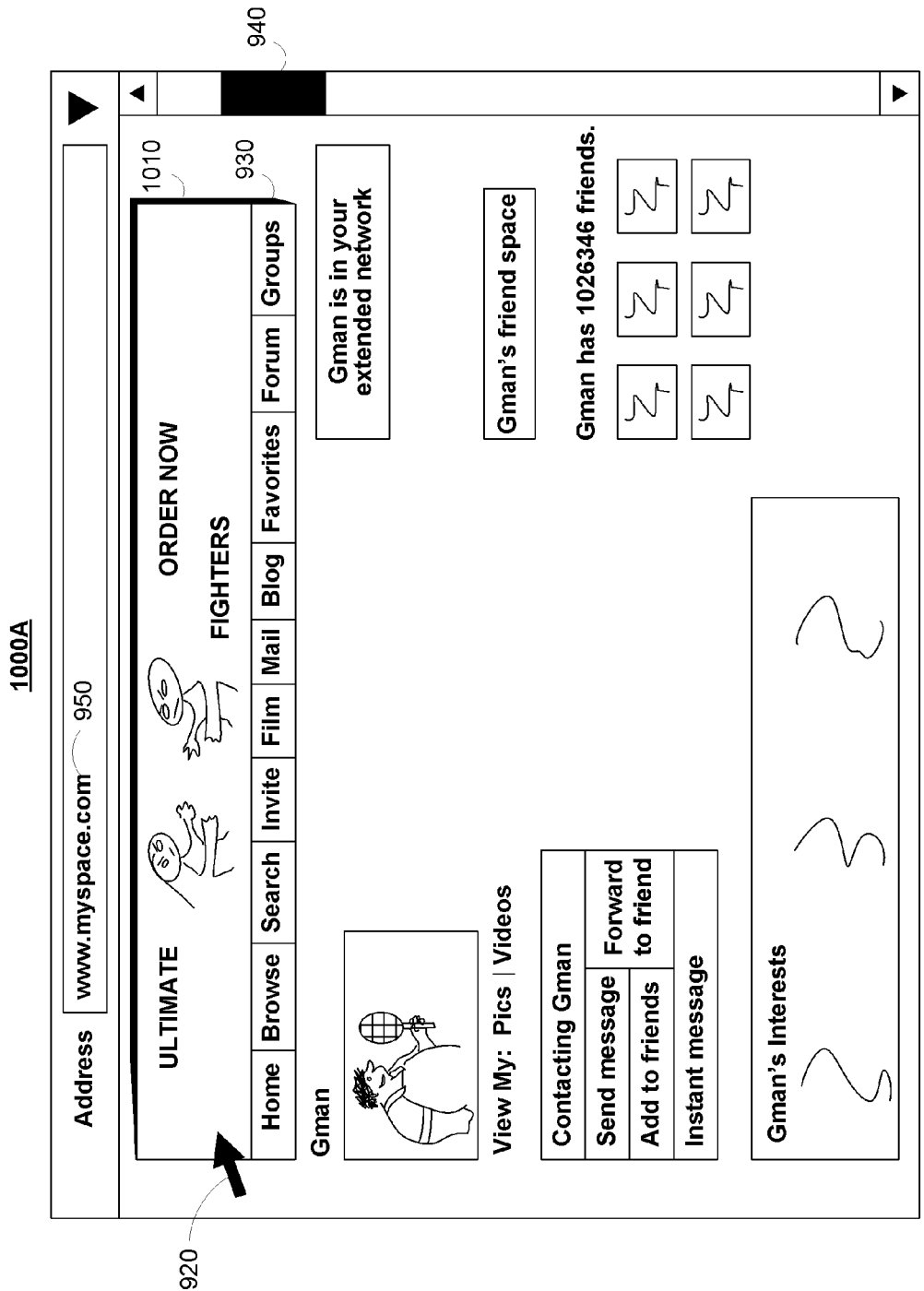
Figure 10B:
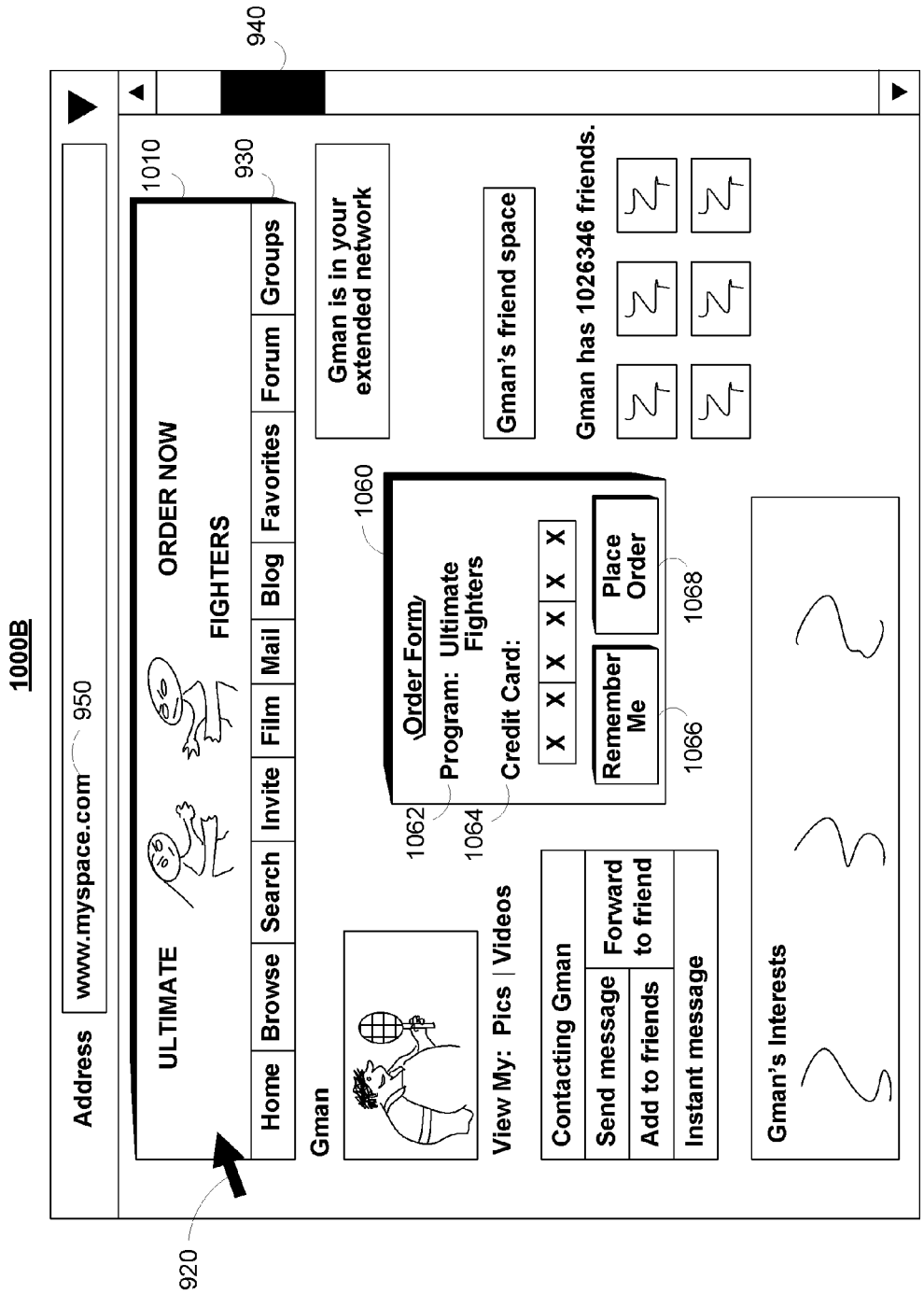

FIGS. 10A and 10B are illustrative web-based remote access service screens of a web page 1000A or 1000B of a website provided by web server 510 (FIG. 5) in accordance with another embodiment of the invention. As shown in FIG. 10A, the user has positioned cursor 920 over the program advertisement 1010. The program being advertised is a program that requires a specific order request. In particular, the advertised program is for the show Ultimate Fighters, a pay-per-view event, which requires payment for access. The user may desire to order the advertised program. In response to the user selecting (e.g., clicking) program advertisement 910, user device 440 may retrieve information (as discussed above) from storage 440 (FIG. 5) and transmit the information to web server 510 (e.g., MySpace.com or any other related or unrelated web server) indicating that the user selected the program advertisement 910. The information may be stored in a cookie on the user device. The information stored in the cookie may include payment information for the program such as a credit card number or some other method of payment. Cookie 1100 (FIG. 11) may include field 1110 for payment information.

Web server 510 may transmit an order request (including information stored in the cookie or alternatively provided by user device 440) to remote access server 460 to order the advertised program. After cross-referencing the order request with an action request, remote access server 460 transmits the action request providing the user television equipment with access rights to access the advertised program.

In another embodiment, web server 510 may purchase the advertised program from remote access server 460 prior to displaying the advertisement with web page 1000A. In such scenarios, the user may be provided with a subscription to the website of web server 510. The subscription may require a monthly payment to the website of web server 510. If the user is a subscriber, then in response to the user's selection of the advertised program, web server 510 may order the program from remote access server 460 without requiring additional payment information from the user. Alternatively, if the user is not a subscriber, web server 510 may prevent the particular advertisement from being displayed or require payment upon selection of the displayed advertisement.

FIG. 10B shows an illustrative display of an order form 1060 which may be provided when no payment information is available on the user device. Order form 1060 may be displayed in response to the user's selection of displayed advertisement 1010. In particular, after the user selects advertisement 1010, information indicating the user's selection and information about the user's equipment is sent to web server 510 (FIG. 5). Processor 514 may determine whether the information transmitted from the user's device includes payment information. If no payment information is available, processor 514 may determine if the user is a subscriber. If the user is not a subscriber and no payment information was provided, then an order form 1060 may be displayed.

Order form 1060 may include the title of the advertised program 1062 (which the user desired to order) and payment information 1064 (e.g., credit card number). The user may enter this information and select the place order option 1068. The order may then be transmitted to remote access server 460 which may grant access rights to the user television equipment 402. The user may also select the remember me option 1066. Remember me option 1066 may add payment information 1064 to cookie 1100 stored on storage 450. When cookie 1100 includes payment information (entered from order form 1060 or by any other means), the selection of advertisement 1010 may automatically cause web server 510 to place an order for the advertised program with remote access server 460 without requiring any further input from the user. Thus, order form 1060 may not be displayed when payment information is provided with (or is stored in) cookie 1100. Remember me option 1066 may alternatively allow the user to subscribe to the website provided by web server 510. The subscription may also prevent order form 1060 from being displayed when the user selects advertisement 1010 and may automatically order the program in response to the user's selection of the advertisement 1010.

Figure 12A:
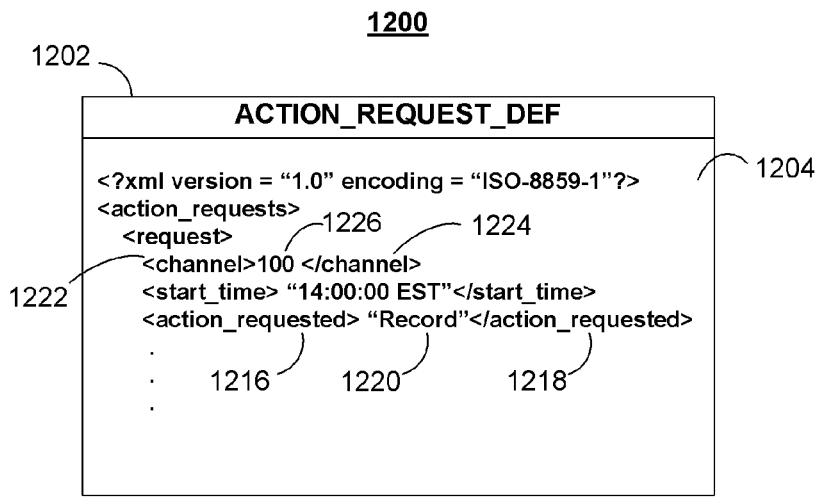
FIGS. 12A and 12B illustrate, respectively, program action request and response datasets in accordance with another embodiment of the invention.

As shown in FIG. 12A, XML tags may be used to define one or more action request definitions. Other suitable data structures may be used in other embodiments. XML file 1200 includes file name 1202, which may be used to uniquely identify the request. In some embodiments, name 1202 includes a unique numeric descriptor. Tag data 1204 may include XML tags that define program channel, action requested (e.g., set reminder or set recording), and the start time, for the program for which the action is requested. For example, action request tags 1216 and 1218 indicate a record request, which is represented by action identifier 1220, and channel tags 1222 and 1224 indicate a specific channel, which is represented by source identifier 1226. Program set definitions may additionally or alternatively include search criteria. These search criteria may define a search string to be executed on a media guidance application database or other content database which may receive the action request definition.

It should be noted that the application program interface (API) for most media guidance access servers 490 (FIG. 4) for media service providers (which may receive and store the action request) may not have the capability to receive other program-specific information such as a program title, a unique program identification, a program source name (e.g., "HBO"), or a unique identifier for the program source. As a result, the examples described herein may not include such program-specific information. However, where the API for the cable provider's server is capable of receiving additional program information, the action request definition generated for the user request may include this additional information without departing from the spirit of the invention. Generally, application program interfaces of different media guidance access servers or provided by different media service providers may differ such that a file representing an action request, such as XML file 1200, that is compatible with one application program interface may not necessarily be compatible with other application program interfaces. For example, different application program interfaces may require action requests to be formatted according to different data structures or to use different tags or identifiers.

The action request definition may be transmitted to be processed by the user equipment. In some embodiments, the action request may be received from the remote access server by the user equipment (e.g., user equipment devices 402, 404, and/or 406 in FIG. 4). The user equipment may process the request using program information from, for example, media guidance data source 418 (FIG. 4). In other embodiments, the action request may be received from the remote access server by a cable provider's remote service server which then subsequently transmits the request to the interactive media guidance application. In some embodiments, the cable provider may store and monitor information relating to the request for further analysis.

In some embodiments, the user equipment or a service provider for the user equipment may send an acknowledgement to the remote access server upon receiving the action request. The acknowledgement may include information previously included in the action request definition and additional program information relating to the actual program against which the requested action is to be performed, such as the program title. This acknowledgment may be conveyed to the user in the form of a pop-up message on the display screen of user device 440 (FIG. 4). The display may include information about an advertised program including the program title and that the program has been scheduled for recording or has been ordered.

Figure 12B:
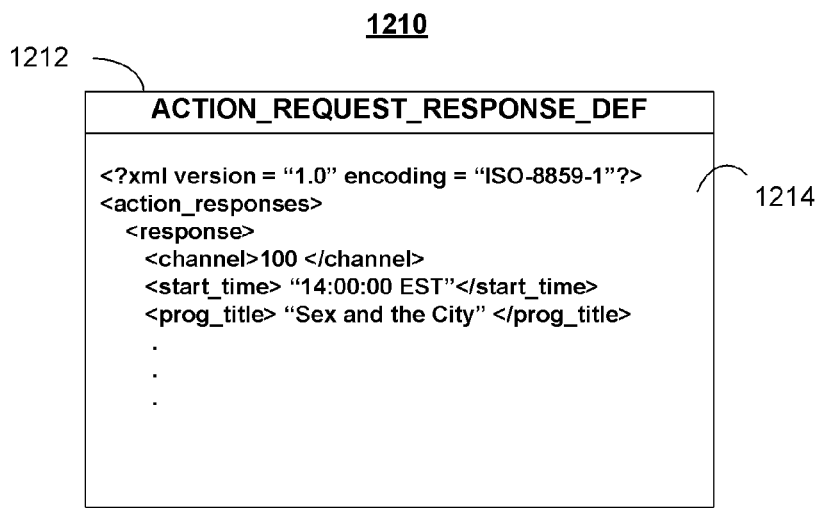

FIG. 12B shows illustrative action request acknowledgement that may be transmitted by the user equipment or a service provider for the user equipment to the remote access server. As shown in FIG. 12B, XML file 1210 may include file name 1212, which may be used to uniquely identify the action request confirmation. Tag data 1214 may include XML tags that define the program title, channel, and start time for the program for which the requested action may have been scheduled. Upon receiving XML file 1210, the remote access server may compare additional information contained in the file with the corresponding information in the remote access program information databases to detect if the wrong program may have been recorded. For example, in screen 800 (FIG. 8A) the user intended to record an episode of "The Crocodile Hunter." However, XML file 1210 includes program title information indicating that the program "Sex and the City" was scheduled to be recorded. The remote access server may use the disparity in title information to detect that the wrong program may have been scheduled to be recorded and take steps to schedule a recording for the correct program.

Figure 13A:
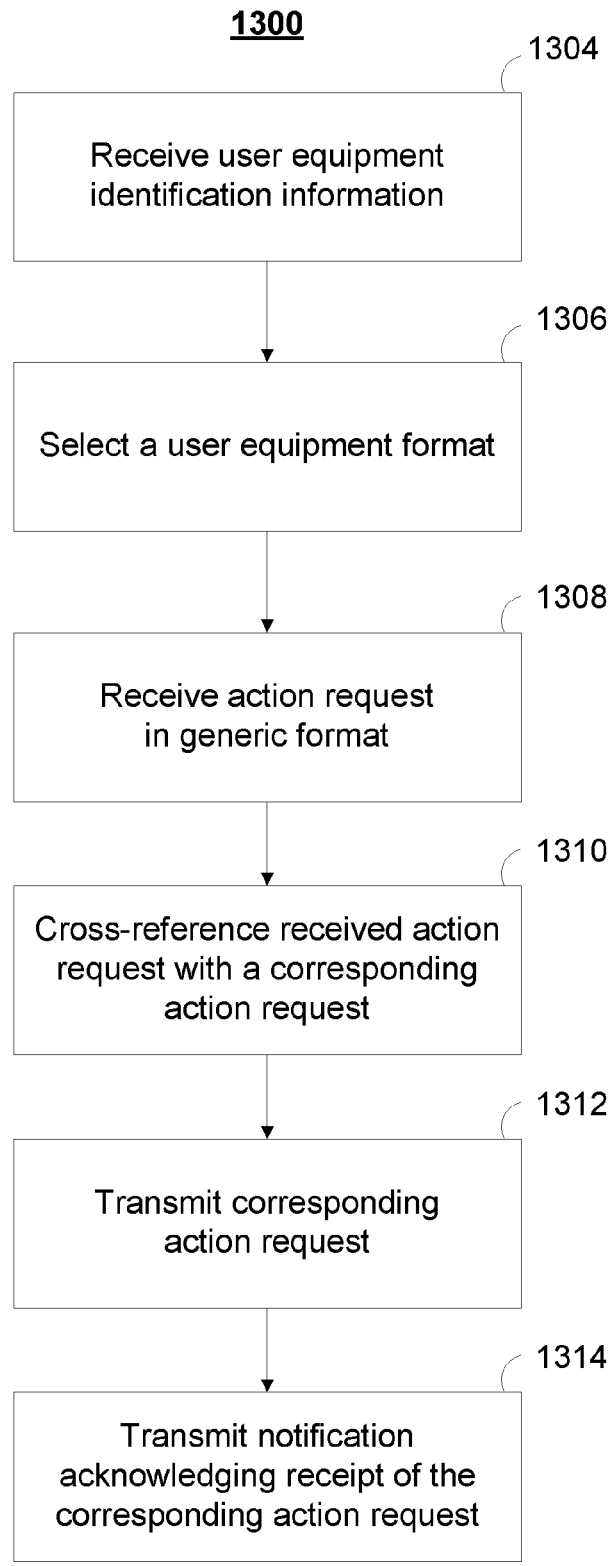

FIG. 13A shows illustrative process 1300 for remotely scheduling an action request with interactive media guidance applications on user equipment according to one embodiment of the invention. A user wishing to remotely access interactive media guidance application on user equipment may begin a remote access request by, for example, providing identification information to remote access client 442 for authenticating with the remote access server 460. In some embodiments, access to remote access server 460 may be restricted to subscribers who may or may not pay a subscription fee. Using a remote access client 442 (e.g., displays in FIGS. 5-7), the user may specify parameters for the action request.

At step 1304, remote access server 460 receives user equipment identification information that may have been transmitted from remote access user device 440 using any suitable communication protocol. The user equipment identification information indicates at least one characteristic of the user equipment (e.g., user equipment 402, 404, or 406), such as the vendor and/or model of the user equipment. For example, the user equipment identification information may indicate that the user equipment includes a 180-hr TiVo Series2 digital video recorder vended by TiVo, Inc. TiVo and Series2 are registered trademarks of TiVo, Inc. Exemplary user equipment identification information may indicate a user account associated with the user equipment, where the user account may be provided by a provider of an interactive media guidance application implemented on the user equipment. Based on such user equipment identification information, processing circuitry 464 may retrieve information stored in storage 470 about the user equipment. For example, user equipment identification information may include a username of the user account, with which processing circuitry 464 may retrieve from storage 470 the vendor and model of the user equipment.

At step 1306, a user equipment format is selected from a plurality of formats based at least in part on the user equipment identification information received at step 1304. The user equipment format may be used to represent action requests in a manner compatible with an application program interface associated with the user equipment, such as media guidance access server application program interface 496 of FIG. 4 or an application program interface that is part of an interactive media guidance application implemented on the user equipment. For example, XML file 1200 in FIG. 12A may represent an action request in a user equipment format compatible with media guidance access server application program interface 496. Generally, the user equipment format may use any suitable data structure and/or include other information, as compared to exemplary XML file 1200, that is compatible with the application program interface associated with the user equipment. The application program interface may be provided by a media service provider and/or incorporated into the user equipment.

At step 1308, a user request is received from remote access user device 440. The user request may indicate instructions for the user equipment, such as scheduling a recording, setting a reminder, or any other function offered by an interactive media guidance application. The user request may be in a format that corresponds to (e.g., be proprietary to) a remote access service provider providing a remote access server, such as remote access server 460, capable of facilitating remote access to a plurality of user equipment devices which do not necessarily have the same application program interface. In some embodiments, the format is compatible with a communication protocol (e.g., hypertext transfer protocol) of a computer network (e.g., the Internet) in communication with a user device (e.g., remote access user device 440) and user equipment. In this case, the user equipment identification information received at step 1304 may indicate an addressable internet protocol address for the user equipment and the user device may access a website to initiate or enable transmission of the user request to the addressable internet protocol address.

The user request may be received by remote access server 460. In particular, the user request may be communicated from remote access client 442 to remote access server application program interface 462 over communication path 482 using any suitable communication protocol. The format in which the user request is transmitted is compatible with remote access server application program interface 462. The user request may be generated for the program selected by the user.

In some embodiments, the user request may be completely generated by remote access user device 440 and passed on to remote access server 460 for transmission. In other embodiments, remote access user device 440 and remote access server 460 may each generate a portion of the user request. For example, remote access user device 440 may generate a user request including user-determined parameters and pass it off to remote access server 460 which may supplement the user request with additional routing or identifying information for subsequent transmission.

The program scheduling information used to generate the user request may be obtained from program listings information stored on storage 470 of the remote server or from a data cache included in storage 450 of remote access user device 440. The scheduling information may be obtained from a data provider for the remote access service (hereinafter referred to as "remote access data") and may not correspond to the program listings information used by the interactive media guidance application implemented on user equipment 402, 404, and/or 406. The program information used by the user equipment devices will hereinafter be referred to as "local guide data." In some embodiments, local guide data, while used by the interactive media guidance application, may be retrieved by the media guidance access server or the cable/satellite/media service provider and passed through to remote access server 460 for inclusion in the user request.

At step 1310, the user request received at step 1308 is cross-referenced with an action request in a user equipment format, which may be the user equipment format selected at step 1306. In particular, the user and action requests may indicate the same instructions for the user equipment while having different formats that are compatible with different application program interfaces. In some embodiments, a lookup table is maintained which cross-references user requests with action requests in a plurality of formats including the user equipment format described above with respect to step 1306. Each user equipment format may be identified by characteristics of the corresponding user equipment such as those indicated by the user equipment identification information received at step 1304. The user request may then be cross-referenced with the corresponding action request via the lookup table. Processing circuitry 464 of remote access server 460 may perform the cross-referencing and may retrieve information from storage 470, which may store the lookup table in any suitable format such as, in Structured Query Language (SQL) format.

FIG. 13B shows illustrative lookup table 1350 for cross-referencing user requests with action requests in a plurality of formats. Lookup table 1350 may include such formats for various media service providers and/or user equipment devices. Lookup table 1350 may include (1) a column 1352 of user requests for the remote access server, where each user request (which is a cell in the column) identifies a different action that may be requested via the remote access service (e.g., "record" or "set reminder"); and (2) a row of user equipment devices 1354, where each user equipment device (which is a cell in row) is identified by vendor and model and implements an interactive media guidance application capable of performing at least one of the actions identified in column 1352. Lookup table 1350 also includes cells of action identifiers. For example, cell 1358 corresponds the action identifier "RM4," which is compatible with the user equipment identifiable as "Comcast CVC8 DVR," to the user request "set reminder," which is specified by the cell in column 1352 of the same row. A lookup table may include other user requests, such as setting personal preferences or changing user account or profile information, and may identify user equipment formats via characteristics other than vendor and model. More than one lookup table may be maintained. For example, each lookup table may correspond to a different set of user requests, whose format or corresponding actions may vary depending on the remote access device. Furthermore, any suitable table layout may be used. For example, instead of one table for all vendors of user equipment devices, the remote access service may have a separate table for each vendor.

At step 1312, remote access server 460 transmits the action request to the interactive media guidance application on the user equipment (e.g., 402, 404, and/or 406) to enable execution of the instructions indicated by the user request received at step 1308. The user equipment may be located at an addressable internet protocol address, in which case the remote access server 460 may directly transmit the action request to the user equipment. The action request may include general criteria for locating the actual program (e.g., start time and channel). In some embodiments, the remote access server may transmit the action request to a media guidance access server 490 of a media service provider of the interactive media guidance application on the user equipment for subsequent transmission to the user equipment. The action request may include program-specific identification for the program (e.g., program title and/or episode title) in cases where the application program interface of media guidance access server 490 is capable of receiving such information.

At step 1314, a notification acknowledging receipt of the action request is transmitted to the remote access server from the interactive media guidance application on the user equipment. The notification may serve to confirm to a user of remote access user device 440 that the action request was successfully communicated to and executed by the user equipment. The notification may be received through communications device 472 by any suitable means. Remote access server 460 may pass the notification on to remote access client 442 through communications path 482. In other embodiments, the notification may be alternatively (or additionally) received by remote access user device 440 through communications device 452 from the interactive media guidance application.

In practice, one or more steps shown in process 1300 may be combined with other steps, performed in any suitable order, performed in parallel (e.g., simultaneously or substantially simultaneously) or removed.

Figure 14:
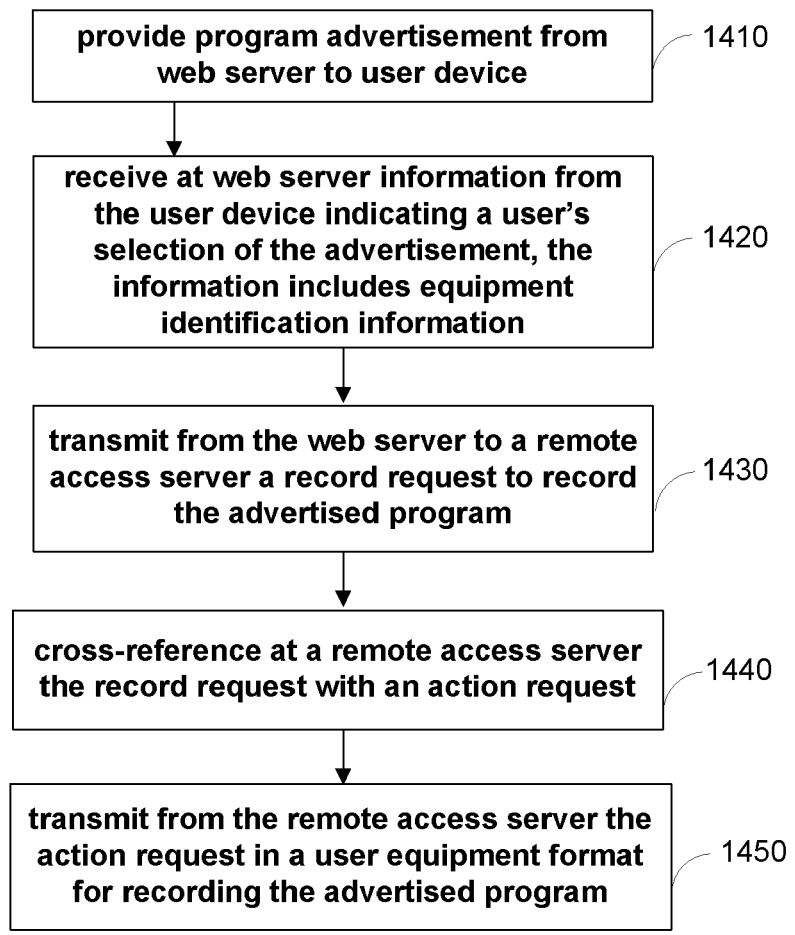

FIG. 14 shows an illustrative process 1400 for scheduling an advertised program for recording in response to a user selection of an advertisement for the program. At step 1410, a program advertisement may be provided to a user device from a web server. For example, web server 510 may provide user device 440 via communications network 414 a web page associated with a website hosted by web server 510 (FIG. 5) the web page including an advertisement for a program. User device 440 may display web page 900A including advertisement 910 (FIG. 9B).

At step 1420, information from the user device indicating a user's selection of the advertisement may be received at the web server. The information includes equipment identification information. For example, in response to the user's selection of advertisement 910 (using cursor 920) (FIG. 9A), processor 444 may retrieve from storage 450 a cookie (FIG. 11) that includes information that identifies the user's equipment 402. This information (e.g., stored in the cookie) may be transmitted over communications network 414 to web server 510 (FIG. 5).

At step 1430, a record request to record the advertised program may be transmitted from the web server to a remote access server. For example, web server 510 may transmit over communications network 414 to remote access server 460 a record request that includes the information that identifies the user's equipment (e.g., the cookie received from the user device) and the advertised program (e.g., program title or broadcast time) (FIG. 5).

At step 1440, the record request may be cross-referenced with an action request at the remote access server. For example, remote access server 460 may perform the functions discussed in connection with step 1310 (FIG. 13A) and FIG. 13B, to cross-reference the record request with an action request in a format compatible with user television equipment 402. This may be done using a look-up table (FIG. 13B) to determine the set of instructions necessary for a particular user television equipment.

At step 1450, the action request may be transmitted from the remote access server in a user equipment format for recording the advertised program. For example, remote access server 460 may transmit over communications path 408 to user television equipment 402 the action request to instruct the television equipment to schedule the advertised program for recording (FIG. 5). An acknowledgment may be provided to the user in the form of a pop-up notification 962 (FIG. 9B) indicating that the program has been scheduled for recording. This is done without navigating the user to a website different from the one which the advertisement for the program was provided.

Figure 15:
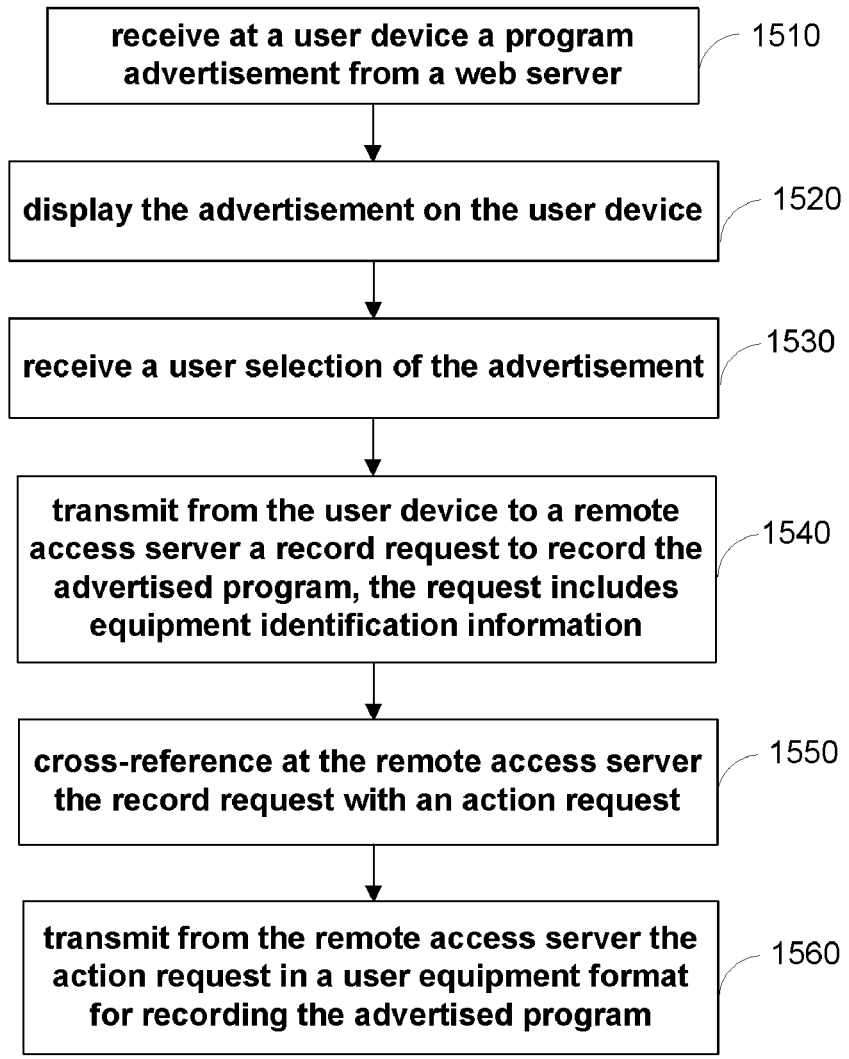

FIG. 15 shows an illustrative process 1500 for scheduling an advertised program for recording in response to a user selection of an advertisement for the program. At step 1510, a program advertisement may be received by a user device from a web server. For example, user device 440 may receive via communications network 414 a web page associated with a website hosted by web server 510 (FIG. 5) the web page including an advertisement for a program from web server 510.

At step 1520, the advertisement may be displayed on the user device. For example, user device 440 may display web page 900A including advertisement 910 (FIG. 9A).

At step 1530, a user selection of the advertisement may be received. For example, display 900A shows cursor 920 positioned over advertisement 910 (FIG. 9A). The user may click the advertisement using cursor 920 to select the displayed advertisement.

At step 1540, a record request may be transmitted from the user device to a remote access server to record the advertised program. The request includes equipment identification information. For example, user device 440 may transmit over communications network 414 to remote access server 460 a record request that includes the information that identifies the user's equipment (e.g., a cookie retrieved from storage 450 on the user device) and the advertised program (e.g., program title or broadcast time) (FIG. 5). This request may be transmitted by wrapping (or including) the information into a URL and transmitting the URL to remote access server 460.

At step 1550, the record request may be cross-referenced with an action request at the remote access server. For example, remote access server 460 may perform the functions discussed in connection with step 1310 (FIG. 13A) and FIG. 13B, to cross-reference the record request with an action request in a format compatible with user television equipment 402. This may be done using a look-up table (FIG. 13B) to determine the set of instructions necessary for a particular user television equipment.

At step 1560, the action request may be transmitted from the remote access server in a user equipment format for recording the advertised program. For example, remote access server 460 may transmit over communications path 408 to user television equipment 402 the action request to instruct the television equipment to schedule the advertised program for recording (FIG. 5).

Figure 16:
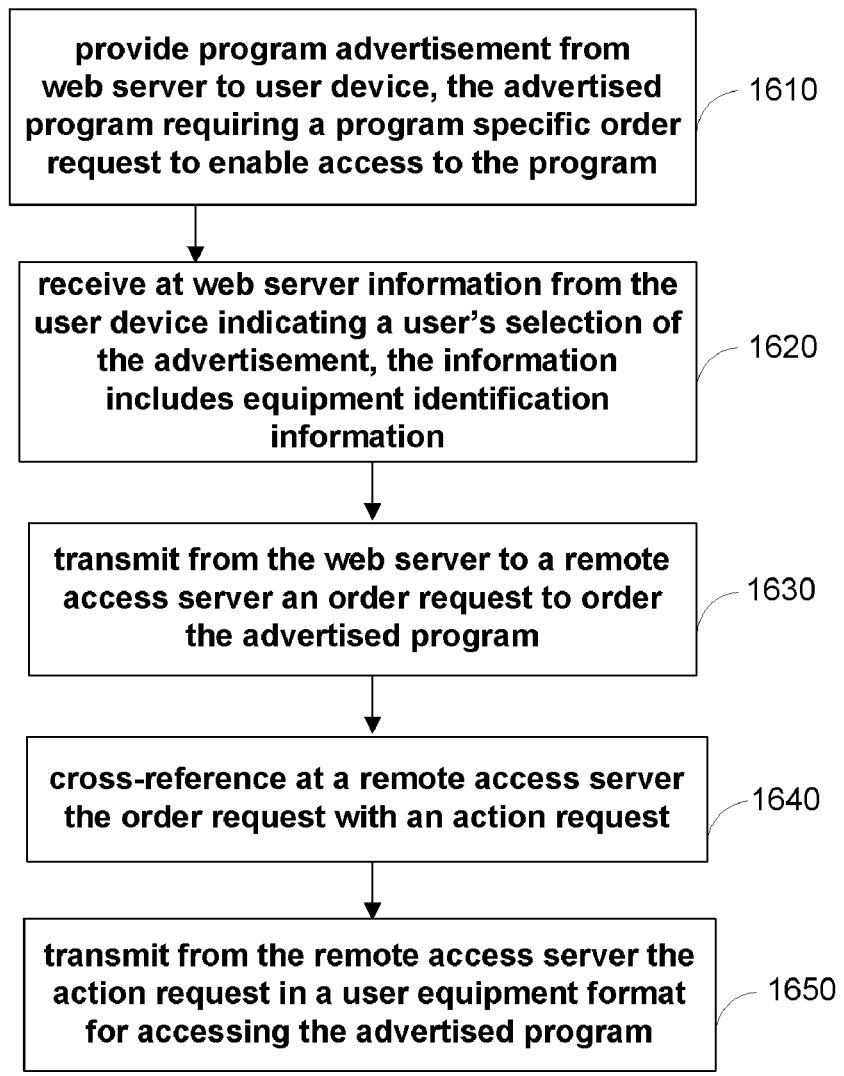

FIG. 16 shows an illustrative process 1600 for ordering an advertised program in response to a user selection of an advertisement for the program. At step 1610, a program advertisement may be provided to a user device from a web server, the advertised program requiring a program specific order request to enable a user television equipment to access to the program. For example, web server 510 may provide user device 440 via communications network 414 a web page associated with a website hosted by web server 510 (FIG. 5) the web page including an advertisement for a program that requires a program specific order request (e.g., pay-per-view program) (FIG. 10A). User device 440 may display web page 900A including advertisement 910 (FIG. 10A).

At step 1620, information from the user device indicating a user's selection of the advertisement may be received at the web server. The information includes equipment identification information. For example, in response to the user's selection of advertisement 910 (using cursor 920) (FIG. 10A), processor 444 may retrieve from storage 450 a cookie (FIG. 11) that includes information that identifies the user's equipment 402. This information (e.g., stored in the cookie) may be transmitted over communications network 414 to web server 510 (FIG. 5).

At step 1630, an order request may be transmitted from the web server to a remote access server to order the advertised program. For example, web server 510 may transmit over communications network 414 to remote access server 460 an order request that includes the information that identifies the user's equipment (e.g., the cookie received from the user device) and the advertised program (e.g., program title or broadcast time) (FIG. 5). The order request may include payment information for requesting the removal of access restrictions from the advertised program. If payment information is not included with the information transmitted by user device 440, an order form 1060 may be displayed to receive payment information (e.g., credit card account number). After payment information is received the order request may be transmitted to the web server including the payment information.

At step 1640, the order request may be cross-referenced with an action request at the remote access server. For example, remote access server 460 may perform the functions discussed in connection with step 1310 (FIG. 13A) and FIG. 13B, to cross-reference the order request with an action request in a format compatible with user television equipment 402. This may be done using a look-up table (FIG. 13B) to determine the set of instructions necessary for a particular user television equipment.

At step 1650, the action request may be transmitted from the remote access server in a user equipment format for accessing the advertised program. For example, remote access server 460 may transmit over communications path 408 to user television equipment 402 the action request to provide access rights (e.g., decryption sequence) to access the advertised program (FIG. 5).

Figure 17:
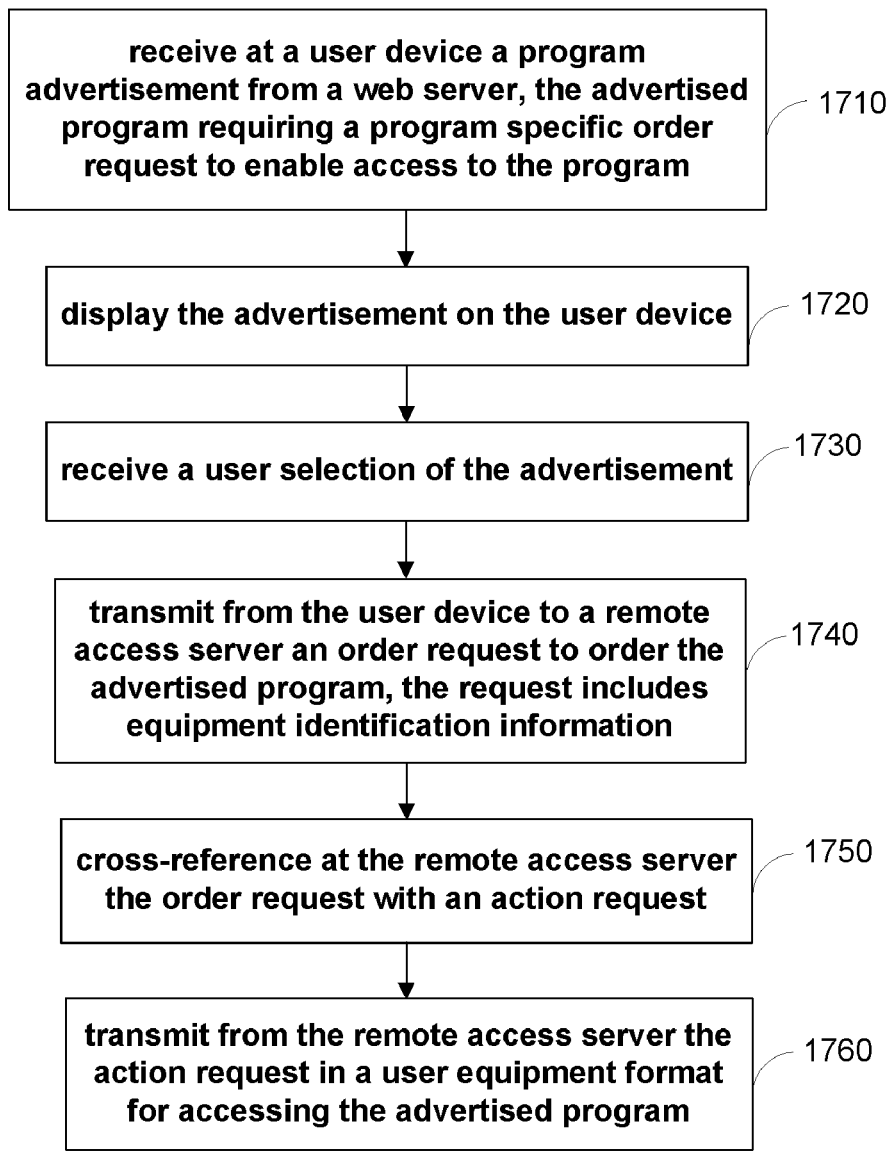

FIG. 17 shows an illustrative process 1700 for ordering an advertised program in response to a user selection of an advertisement for the program. At step 1710, a program advertisement may be received by a user device from a web server, the advertised program requiring a program specific order request to enable a user equipment device to access the program. For example, user device 440 may receive via communications network 414 a web page associated with a website hosted by web server 510 (FIG. 5) the web page including an advertisement for a program from web server 510.

At step 1720, the advertisement may be displayed on the user device. For example, user device 440 may display web page 1000A including advertisement 1010 (FIG. 10A).

At step 1730, a user selection of the advertisement may be received. For example, display 1000A shows cursor 920 positioned over advertisement 1010 (FIG. 10A). The user may click the advertisement using cursor 920 to select the displayed advertisement.

At step 1740, an order request may be transmitted from the user device to a remote access server to order the advertised program. The request includes equipment identification information. For example, user device 440 may transmit over communications network 414 to remote access server 460 an order request that includes the information that identifies the user's equipment (e.g., a cookie retrieved from storage 450 on the user device) and the advertised program (e.g., program title or broadcast time) (FIG. 5). The request may also include payment information for requesting the removal of access restrictions from the advertised program. This request may be transmitted by wrapping (or including) the information into a URL and transmitting the URL to remote access server 460. If payment information is not included with the order request transmitted by user device 440, an order form 1060 may be provided by remote access server 460 and displayed on user device 440 to receive payment information (e.g., credit card account number) for the advertised program.

At step 1750, the order request may be cross-referenced with an action request at the remote access server. For example, remote access server 460 may perform the functions discussed in connection with step 1310 (FIG. 13A) and FIG. 13B, to cross-reference the order request with an action request in a format compatible with user television equipment 402. This may be done using a look-up table (FIG. 13B) to determine the set of instructions necessary for a particular user television equipment.

At step 1760, the action request may be transmitted from the remote access server in a user equipment format for accessing the advertised program. For example, remote access server 460 may transmit over communications path 408 to user television equipment 402 the action request including access rights (e.g., decryption sequence) for removing access restrictions from the advertised program (FIG. 5).

Figure 18A:
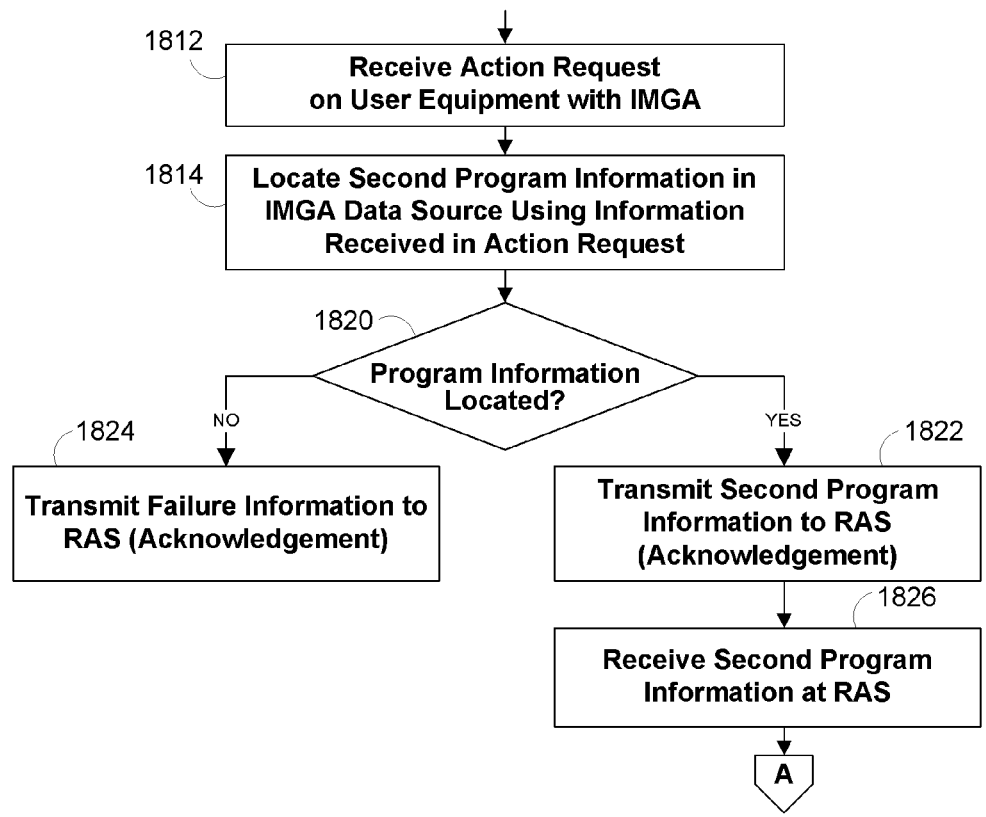
Figure 18B:
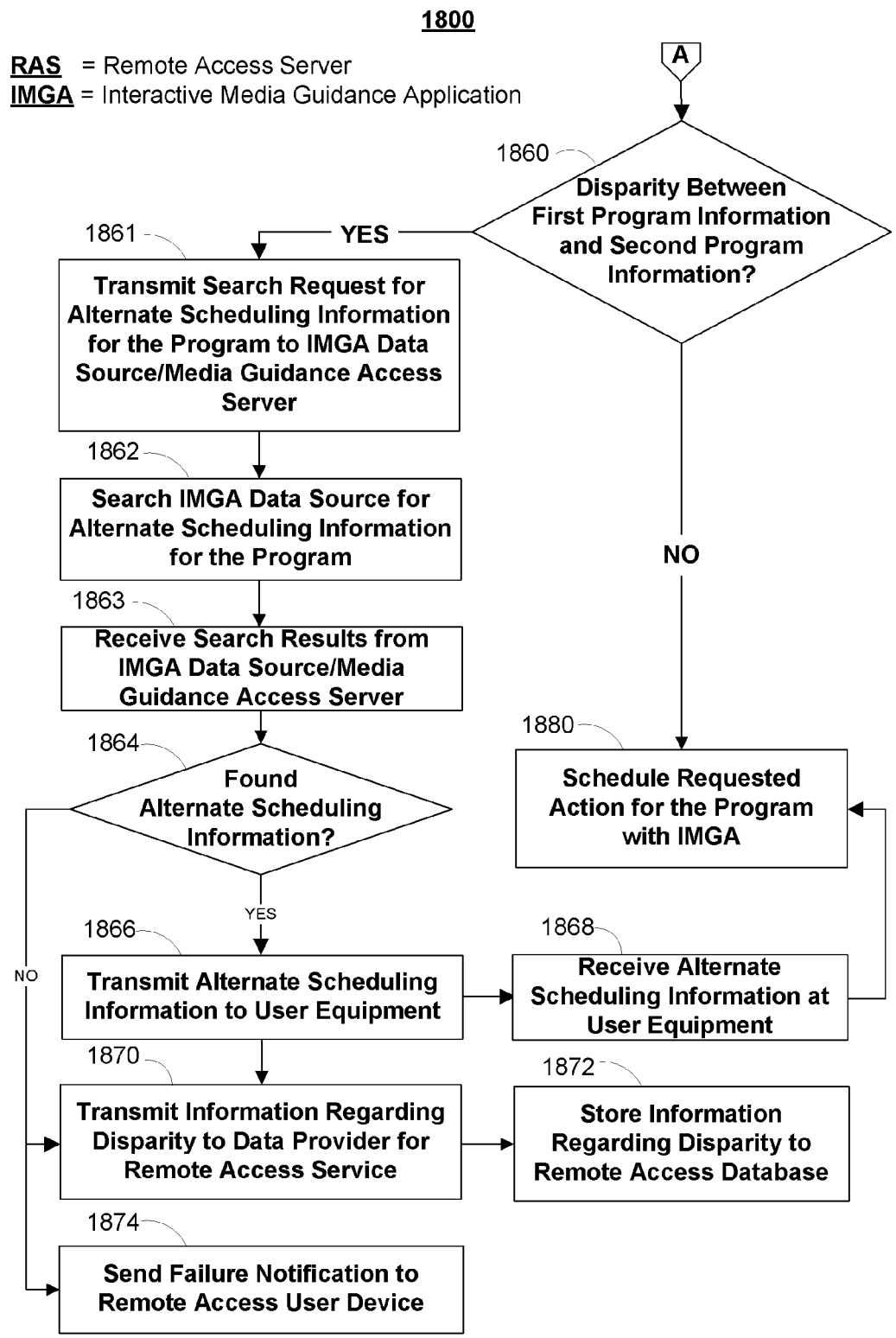

FIGS. 18A and 18B collectively show illustrative process 1800 for managing and correcting disparities that may be found between program listings data when providing remote access to functions on interactive media guidance applications. Process 1800 may be used in combination with process 1300 of FIG. 13A. At step 1812, an action request, such as the action request of FIG. 13A, is received on the user equipment. The action request may be received from remote access server 460 (FIG. 4) or through an intermediate server such as media guidance access server 490 (FIG. 4) for the media service provider of the interactive media guidance application. The process continues to step 1814.

At step 1814, the interactive media guidance application locates, in the media guidance information (e.g., media guidance data source 418 of FIG. 4) provided by a media service provider, the corresponding program information for which the requested action will be scheduled. The corresponding program information is located based on scheduling information received in the action request. In some embodiments, the action request may include, for example, the start time and the channel for the program for which the action is requested without including the actual program identifier. The program identifier for the corresponding program may be located by the interactive media guidance application on the user equipment or by the media service provider for the interactive media guidance application and passed through to the interactive media guidance application on the user equipment. The search for the corresponding program information may be controlled by processor 300 (FIG. 3) in user equipment devices 402, 404, and/or 406 (all of FIG. 4) or any other processor associated with the interactive media guidance application. In some embodiments the action request may include the appropriate program identifier for the media service provider of the interactive media guidance application.

At step 1820, a determination is made whether program information corresponding to the scheduling information included in the action request has been located in media guidance data source 418 (FIG. 4). If the interactive media guidance application is unable to locate the corresponding program information, an acknowledge may be transmitted to the remote access server at step 1824 to indicate that the requested action was not scheduled. If the interactive media guidance application is able to locate the corresponding program information, the process continues to step 1822.

At step 1822, the corresponding program information from the local guide data (e.g., channel, start time, and program title) is transmitted to the remote access server in an acknowledgment from the interactive media guidance application on the user equipment. For example, XML file 1210 may be transmitted to the remote access server in acknowledgement to the action request received at step 1812. The interactive media guidance application may transmit the acknowledgement to the remote access service without first scheduling the requested action on the user equipment. In these embodiments, the action request may be stored on media guidance access server 490 (FIG. 4) of a media service provider and/or on the user equipment (e.g., on storage 308 of processor 300 in 402, 404, and/or 406) while waiting for the remote access server to instruct the user equipment at step 1880 (described in more detail below) to proceed to schedule the action based on the corresponding program information transmitted to the remote access server at step 1822 above. The process continues to step 1826.

At step 1826, the acknowledgment is received by remote access server 460. The acknowledgement may be received through communications device 472 by any suitable means. In some embodiments, remote access server 460 may pass the acknowledgement on to remote access client 442 through communications path 482. In other embodiments, the acknowledgement may be alternatively (or additionally) received by remote access user device 440 through communications device 452 (all of FIG. 4) from the interactive media guidance application.

At step 1860, using the program information included in the acknowledgment received from the interactive media guidance application, a determination is made whether a disparity exists between the program information for the program in remote access server 460 and the program information for the program in the local guide data used by the interactive media guidance application on user equipment 402, 404, and/or 406 (all of FIG. 4). This determination may be made by remote access user device 440 (FIG. 4) or by remote access server 460 (FIG. 4). For example, program title included in the acknowledgment in XML file 1210 (FIG. 12B) may be compared with the corresponding program title in the remote access data. In the illustration presented in screen 800 (FIG. 8A) the user intended to schedule a recording of an episode of "The Crocodile Hunter" with the interactive media guidance application. However, when the selected channel and start time were transmitted to the interactive media guidance application in XML file 1200 (FIG. 12A), the interactive media guidance application responded with acknowledgement XML file 1210 (FIG. 12B) indicating that the program corresponding to the channel and start time was "Sex and the City." In this instance, the remote access server may compare the program title included in XML file 1210 with the corresponding program title for the schedule in the remote access data to detect the disparity.

If no disparity is detected at step 1860, the process continues to step 1880 where the requested action is scheduled with the interactive media guidance application on the user equipment. The interactive media guidance application may schedule a recording, set up a reminder, or schedule some other program-specific action for the program located by the interactive media guidance application in step 1820. Depending on the options contained in the action request, the interactive media guidance application may also schedule other actions related to the action request such as, for example, scheduling a future date for when the recorded program may be deleted from the user equipment.

If a disparity is detected at step 1860, the process continues to step 1861. At step 1861, remote access server 460 transmits a search request for alternate scheduling information for the program to media guidance access server 490 and/or to media guidance data source 418 (all of FIG. 4). The search request may include a SQL-based query for program information meeting certain criteria. For example, in the illustration discussed above in connection with step 1860, the search request may include a SQL-based query for all channel and start times associated with all programs whose program title contains the word "Crocodile."

At step 1862, using the search request transmitted by the remote access server, a search may be performed on media guidance data source 418 (FIG. 4) for alternate scheduling information for the target program for which the user intended to schedule the action. The search may be performed on one or more media guidance data sources 418 for one or more media service providers. In addition to the program title, the search may consider additional program information such series identifier, program rating, standard/high definition indicator, episode title, and any combination of these properties.

Complex, flexible matching algorithms that may support exact match techniques and/or partial or "fuzzy" matching logic (e.g., searching for a closest match) may be used by the search to locate alternate scheduling information for the program. During the search, program information associated with programs on different channels may be compared to program information for the target program selected by the user. Based on the degree of similarity between the program information for a program and the target program selected by the user, a "similarity rating" may be assigned to that particular program for that channel. The similarity rating may be determined using any suitable algorithm or weighting logic. For example, a substantial similarity between program titles and/or episode titles may be weighted more heavily in the similarity rating algorithm than an exact match between program rating information. Program information for programs on a plurality of channels associated with media guidance data source 418 (FIG. 4) may be searched. Searching for alternate scheduling information may involve searching alternate scheduling information from a plurality of media service providers (e.g., cable service providers and satellite service providers), whether that information is stored in one database or a plurality of databases. For example, searching for alternate scheduling information may involve searching a plurality of databases for media guidance data source 418 (FIG. 4), in which each database is associated with a different media service provider. In some embodiments, remote access server 460 may have direct access to media guidance data source 418. In these embodiments, remote access server 460 may by-pass media guidance access server 490 and perform a search on media guidance data source 418 using a remote access connection. It should be noted that the similarity rating algorithms discussed above may occur at remote access server 460 (FIG. 4) after the initial search results are received from the media guidance access server at step 1863 (described below). For example, the remote access server may request (at step 1861) a "crude" set of program information that may potentially match the target program and refine this set to narrow it down to the closest matches. When the search is completed, the process continues to step 1863.

At step 1863, remote access server 460 receives the search results from media guidance access server 490 or alternatively from media guidance data source 418 (all of FIG. 4). The search result may include program information sets for all programs matching the search query. Alternatively, the remote access server and/or media guidance access server may set a maximum number of program information sets to be returned in the results. In some embodiments, the results may include additional status indicator informing the remote access server of the number of results returned by the query and/or some other status indicia for the query. The process continues at step 1864.

At step 1864, a determination is made whether alternate scheduling information is found for the original program selected by the user. The remote access system may set minimum matching requirements for deciding whether appropriate alternate scheduling information has been located. In a typical usage scenario, the remote access system may use a "substantial similarity" test. In some embodiments, only scheduling information for programs having similarity ratings that satisfy the predetermined minimum criterion may pass the substantial similarity test and, consequently, be considered alternate scheduling information for the original program selected by the user. For example, assume that the similarity rating for the program information for a program associated with a channel may range from 0 to 100, where 0 indicates that the program is completely mismatched with the original program selected by the user, and 100 indicates an exact match with the original program selected by the user. In an illustrative substantial similarity test, the remote access system may set a predetermined minimum criterion that program information for the program may be considered alternate scheduling information for the original program selected by the user only if it has a similarity rating that is 50 or higher. If no other program passes the substantial similarity test, the remote access system may conclude that alternate scheduling information could not be located for the original program selected by the user. Note that the actual method for determining similarity between two or more programs may be based on any appropriate test or algorithm without deviating from the spirit of the invention. If alternate scheduling information is not found, the process may continue to step 1870 (described in more detail below) where corrective action may be taken, and to step 1874 where the user is informed that the action request could not be scheduled. Otherwise, the process may continue to step 1866.

At step 1866, the remote access user device or the remote access server may transmit alternate scheduling information to the user equipment (or to a service provider for subsequent transmission to the interactive media guidance application). The remote access system may also set minimum matching requirements for choosing which of several close-matching alternate scheduling information sets to transmit to the interactive media guidance application on the user equipment. In some embodiments, the program information for all channels that satisfy the predetermined minimum criterion as described in step 1862 may be transmitted. In other embodiments, the program information for only the channel with the highest similarity rating may be transmitted. In still other embodiments, up to a predetermined number of program information for channels with highest similarity ratings may be transmitted. The alternate scheduling information may be transmitted in XML format similar to XML file 1200 (FIG. 8). If alternate scheduling information includes scheduling information from multiple programs, the remote access server may send one XML file 1200 each for the alternate scheduling information for each program, or send one XML file 1200 including a list of the alternate scheduling information for all programs. After alternate scheduling information is transmitted, the process may continue to steps 1868 (described below) and 1870.

At step 1870, remote access server 460 may transmit information regarding the disparity to a provider of program information for the remote access service. The data provider may use the disparity information to improve the accuracy of program information available to the remote access server for future request. In addition to transmitting information about the disparity, the remote access server may also store at least a portion of this information at step 1872 for use in future action requests to interactive media guidance applications on user equipment devices using the same media service provider.

At step 1868, the interactive media guidance application of media guidance system 400 receives alternate scheduling information for scheduling the requested action. Similar to step 1812 described above, the interactive media guidance application on user equipment 402, 404 and/or 406 (all of FIG. 4) may receive the alternate scheduling information from the remote access server or alternatively, from a media guidance access server 490 (FIG. 4) of a media service provider for the interactive media guidance application. After the interactive media guidance application receives alternate scheduling information, the process may continue at step 1880 (described above) where the interactive media guidance application on the user equipment schedules the action for the program based on the alternate scheduling information.

In practice, one or more steps shown in process 1800 may be combined with other steps, performed in any suitable order, performed in parallel (e.g., simultaneously or substantially simultaneously) or removed. Other embodiments of processes that may be used in conjunction with process 1300 of FIG. 13A are described in Klappert, U.S. patent application Ser. No. 11/643,507 filed Dec. 20, 2006, which is herein incorporated by reference in its entirety.

It will be appreciated that while the discussion of media content has focused on video content, the principles of media guidance can be applied to other types of media content, such as music, images, and multi-media content.

The above described embodiments of the present invention are presented for purposes of illustration and not of limitation, and the present invention is limited only by the claims which follow.

What is claimed is:

1. A method for remotely ordering programs for user equipment implementing an interactive media guidance application, the method comprising:
    embedding, without user input, an interactive program advertisement, provided from a web server, in a web page provided to a user device, wherein:
        the program advertisement uniquely identifies an advertised program,
        the advertised program has access restrictions that require a program specific order request to enable access to the advertised program on the user equipment,
        the web server (1) is not associated with the user equipment and (2) corresponds to a first entity;
    the web page including the program advertisement is displayed on the user device; and
    the user's selection of the displayed program advertisement is received on the user device;
    receiving, at the web server, information from the user device indicating a user's selection of the program advertisement, wherein the information includes user information stored on the user device, and wherein the information is transmitted, from the user device, indicating the user's selection of the program advertisement to the web server in response to the user's selection of the displayed program advertisement, without navigating the user to another website;
    transmitting from the web server to a remote access server an order request to order the advertised program, wherein:
        the order request includes the user information, and
        the remote access server (1) is associated with the user equipment and (2) corresponds to a second entity, different from the first entity, that enables access to the advertised program on the user equipment, wherein:
        the order request is cross-referenced at the remote access server with an action request in a user equipment format selected from a plurality of formats to be compatible with the user equipment, wherein the action request comprises access information; and
        the action request is transmitted from the remote access server in the user equipment format for receipt by the user equipment for accessing the advertised program.

2. The method of claim 1 wherein the order request is transmitted without user input further to the selection of the displayed advertisement.

3. The method of claim 1 wherein the information stored on the user device is stored in a cookie.

4. The method of claim 1 wherein:
    the advertised program is encrypted or encoded; and
    the access information of the action request comprises an encryption sequence or decoding information for decrypting or decoding the advertised program.

5. A method for remotely ordering programs for user equipment implementing an interactive media guidance application, the method comprising:
    receiving, at a user device, an interactive program advertisement from a web server, wherein:
        the interactive program advertisement is embedded, without user input, in a web page of a website,
        the program advertisement uniquely identifies an advertised program,
        the advertised program has access restrictions that require a program specific order request to enable access to the advertised program on the user equipment, and
        the web server (1) is not associated with the user equipment and (2) corresponds to a first entity;
    displaying the program advertisement on the web page of the website on the user device;
    receiving a user's selection of the program advertisement; and
    transmitting, in response to receiving the user's selection of the program advertisement, an order request to order the advertised program from the user device to a remote access server without navigating the user to another website, wherein:
        the order request includes information stored on the user device comprising user information and user equipment identification information,
        the remote access server (1) is associated with the user equipment and (2) corresponds to a second entity, different from the first entity, that enables access to the advertised program on the user equipment,
        the order request is cross-referenced at the remote access server with an action request in a user equipment format selected from a plurality of formats to be compatible with the user equipment, wherein the action request comprises access information; and
        the action request is transmitted, in the user equipment format, from the remote access server for receipt by the user equipment for accessing the advertised program.

6. The method of claim 5 wherein the program advertisement is received in a format compatible with a hypertext transfer protocol.

7. The method of claim 6 wherein the program advertisement includes a Uniform Resource Locator (URL) of the remote access server, the URL includes information that identifies the advertised program to the remote access server.

8. The method of claim 5 wherein the request is transmitted from the user device without user input further to the selection of the displayed advertisement.

9. The method of claim 5 wherein the information stored on the user device is stored in a cookie.

10. A system for remotely ordering programs for user equipment implementing an interactive media guidance application, the system comprising:
first communications circuitry configured to:
provide an interactive program advertisement from a web server to a user device, wherein:
the interactive program advertisement is embedded, without user input, in a web page,
the advertisement uniquely identifies an advertised program,
the advertised program has access restrictions that require a program specific order request to enable access to the advertised program on the user equipment,
the user device comprises:
second communications circuitry;
a display screen for displaying the web page of a web site, including the program advertisement; and
a processor configured to:
receive the user's selection of the displayed advertisement on the user device; and
direct the second communications circuitry to transmit the information indicating the user's selection of the program advertisement to the web server in response to the user's selection of the displayed advertisement without navigating the user to another website;
the web server (1) is not associated with the user equipment and (2) corresponds to a first entity;
receive at the web server information from the user device indicating a user's selection of the program advertisement, wherein the information includes user information stored on the user device;
transmit from the web server to a remote access server an order request to order the advertised program, wherein:
the order request includes the user information,
the remote access server (1) is associated with the user equipment and (2) corresponds to a second entity, different from the first entity, that enables access to the advertised program on the user equipment, and
the remote access server comprises a processor configured to:
cross-reference the order request with an action request in a user equipment format selected from a plurality of formats to be compatible with the user equipment, wherein the action request comprises access information; and
direct third communications circuitry to transmit the action request in the user equipment format for receipt by the user equipment for accessing the advertised program.

11. The system of claim 10 wherein the order request is transmitted without user input further to the selection of the displayed advertisement.

12. The system of claim 10 wherein the information stored on the user device is stored in a cookie.

13. The system of claim 10 wherein:
the advertised program is encrypted or encoded; and
the access information of the action request comprises an encryption sequence or decoding information for decrypting or decoding the advertised program.

14. A system for remotely ordering programs for user equipment implementing an interactive media guidance application, the system comprising:
first communications circuitry; and
a processor on a user device configured to:
receive an interactive program advertisement from a web server, wherein:
the interactive program advertisement is embedded, without user input, in a web page of a website,
the advertisement uniquely identifies an advertised program,
the advertised program has access restrictions that require a program specific order request to enable access to the advertised program on the user equipment, and
the web server (1) is not associated with the user equipment and (2) corresponds to a first entity;
display on a display screen the program advertisement on the web page of the website on the user device;
receive a user's selection of the program advertisement; and
direct, in response to the receiving the user's selection of the program advertisement, the first communications circuitry to transmit an order request to order the advertised program from the user device to a remote access server without navigating the user to another website, wherein
the order request includes information stored on the user device comprising user information and user equipment identification information, and
the remote access server (1) is associated with the user equipment and (2) corresponds to a second entity, different from the first entity, that enables access to the advertised program on the user equipment; and
wherein a processor on the remote access server is configured to:
cross-reference the order request with an action request in a user equipment format selected from a plurality of formats to be compatible with the user equipment, wherein the action request comprises access information; and
direct second communications circuitry to transmit, from the remote access server, the action request in the user equipment format for receipt by the user equipment for accessing the advertised program.

15. The system of claim 14 wherein the program advertisement is received in a format compatible with a hypertext transfer protocol.

16. The system of claim 15 wherein the program advertisement includes a Uniform Resource Locator (URL) of the remote access server, the URL includes information that identifies the advertised program to the remote access server.

17. The system of claim 14 wherein the request is transmitted from the user device without user input further to the selection of the displayed advertisement.

18. The system of claim 14 wherein the information stored on the user device is stored in a cookie.

19. The method of claim 1 further comprising:
determining whether the user is a subscriber to a service that provides the advertised program; and preventing the providing of the program advertisement if the user is not a subscriber.

20. The method of claim 1 further comprising:
determining whether the information from the user device includes payment information; and
determining whether the user is a subscriber to a service that provides the advertised program if the information does not include payment information.

21. The method of claim 1 further comprising:
determining whether the user is a subscriber to a service that provides the advertised program; and
providing an order form if the user is not a subscriber.

22. The method of claim 1 further comprising:
communicating between the web server and the remote access server to generate information that (1) uniquely identifies the web server to the remote access server, and (2) identifies the advertised program; and generating the program advertisement to be associated with the generated information.

23. The method of claim 1 wherein:
the web server provides a first website, and
the remote access server provides a second website operable to provide program listings.

24. The method of claim 1, wherein the information received at the web server is a user request that includes user equipment identification information, and the order request includes user equipment identification information.

25. The system of claim 10, wherein the information received at the web server is a user request that includes user equipment identification information, and the to order request includes user equipment identification information.

* * * * *

UNITED STATES PATENT AND TRADEMARK OFFICE
CERTIFICATE OF CORRECTION

| | | |
|---|---|---|
| PATENT NO. | : 8,327,403 B1 | Page 1 of 1 |
| APPLICATION NO. | : 11/851573 | |
| DATED | : December 4, 2012 | |
| INVENTOR(S) | : Chilvers et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this
Eleventh Day of November, 2014

Michelle K. Lee
*Deputy Director of the United States Patent and Trademark Office*